US012682246B2

(12) United States Patent
Wong et al.

(10) Patent No.: US 12,682,246 B2
(45) Date of Patent: Jul. 14, 2026

(54) NEUROSYNAPTIC PROCESSING CORE WITH SPIKE TIME DEPENDENT PLASTICITY (STDP) LEARNING FOR A SPIKING NEURAL NETWORK

(71) Applicant: AGENCY FOR SCIENCE, TECHNOLOGY AND RESEARCH, Singapore (SG)

(72) Inventors: Ming Ming Wong, Singapore (SG); Sumit Bam Shrestha, Singapore (SG); Vishnu Paramasivam, Singapore (SG); Aarthy Mani, Singapore (SG); Wenyu Jiang, Singapore (SG); Anh Tuan Do, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 703 days.

(21) Appl. No.: 18/042,718

(22) PCT Filed: Aug. 31, 2020

(86) PCT No.: PCT/SG2020/050506
§ 371 (c)(1),
(2) Date: Feb. 23, 2023

(87) PCT Pub. No.: WO2022/045961
PCT Pub. Date: Mar. 3, 2022

(65) Prior Publication Data
US 2023/0351195 A1      Nov. 2, 2023

(51) Int. Cl.
*G06N 3/088* (2023.01)
*G06N 3/049* (2023.01)
(52) U.S. Cl.
CPC ............. *G06N 3/088* (2013.01); *G06N 3/049* (2013.01)

(58) Field of Classification Search
CPC ............................... G06N 3/088; G06N 3/049
(Continued)

(56) References Cited

U.S. PATENT DOCUMENTS 8,606,732 B2 * 12/2013 Venkatraman ......... G06N 3/063
706/27
9,245,223 B2 * 1/2016 Modha ..................... G06N 3/08
(Continued)

FOREIGN PATENT DOCUMENTS

CN        108985447 A     12/2018
WO      2017/172174 A1     10/2017

OTHER PUBLICATIONS

International Search Report for International Application No. PCT/SG2020/050506 mailed Dec. 23, 2020 (2 pages).
(Continued)

*Primary Examiner* — Taghi T Arani

(57) ABSTRACT

There is provided a neurosynaptic processing core with spike time dependent plasticity (STDP) learning for a spiking neural network, including: a spiking neuron block including a pre-synaptic block and a post-synaptic block; a synapse block communicatively coupled to the spiking neuron block; a STDP learning block communicatively coupled to the spiking neuron block and the synapse block, the STDP learning block including a pre-synaptic event accumulator including a pre-synaptic spike event memory block and a pre-synaptic spike parameter modifier; a post-synaptic event accumulator including a post-synaptic spike event memory block and a post-synaptic spike parameter modifier, a weight change accumulator, and a weight change parameter modifier; a learning error modulator; and a synaptic weight modifier configured to modify a synaptic weight parameter based on a weight change parameter and a learning error corresponding to the synaptic weight param- (Continued)

eter. There is also provided a corresponding method of operating and a corresponding method of forming the neurosynaptic processing core.

20 Claims, 18 Drawing Sheets

(58) Field of Classification Search
USPC .......................................................... 706/25
See application file for complete search history.

(56) References Cited

U.S. PATENT DOCUMENTS

| 9,489,617 | B2 * | 11/2016 | Chu | ........................ G06N 3/09 |
| 2012/0011089 | A1 * | 1/2012 | Aparin | .................... G06N 3/063 |
| | | | | 706/33 |
| 2012/0173471 | A1 * | 7/2012 | Ananthanarayanan | ...................... |
| | | | | G06N 3/049 |
| | | | | 706/29 |
| 2014/0358834 | A1 * | 12/2014 | Kim | ........................ G06N 3/088 |
| | | | | 706/25 |
| 2015/0106310 | A1 * | 4/2015 | Birdwell | .............. G06N 3/0495 |
| | | | | 706/26 |
| 2015/0106316 | A1 * | 4/2015 | Birdwell | .............. G06N 3/0499 |
| | | | | 706/33 |
| 2015/0286925 | A1 * | 10/2015 | Levin | ..................... G06N 3/082 |
| | | | | 706/25 |
| 2017/0286829 | A1 * | 10/2017 | Chen | ...................... G06N 3/063 |
| 2019/0042915 | A1 * | 2/2019 | Akin | ....................... G06N 3/065 |
| 2019/0392303 | A1 * | 12/2019 | Cherubini | ............ G06N 3/0895 |
| 2020/0184325 | A1 * | 6/2020 | Moraitis | .............. G06N 3/0499 |

OTHER PUBLICATIONS

Kusmierz L, et al., "Learning with three factors: modulating Hebbian plasticity with errors," Current Opinion in Neurobiology, Sep. 15, 2017, vol. 46, pp. 170-177.

Bi, et al., "Synaptic modification by correlated activity: Hebb's postulate revisited", Annual review of neuroscience, 24 (1):139-166, 2001.

Sjostrom, et al., "Dendritic excitability and synaptic plasticity, Physiological reviews", 88(2):769-840, 2008.

Ponulak, et al., "Introduction to spiking neural networks: Information processing, learning and applications", Acta neurobiologiae experimentalis, 71(4):409-433, 2011.

Davies, et al., A neuromorphic manycore processor with on-chip learning. IEEE Micro, 38(1):82-99, 2018.

Chen, et al., A 4096-neuron 1m-synapse 3.8-pj/sop spiking neural network with on-chip stop learning and sparse weights in 10-nm finfet cmos, IEEE Journal of Solid-State Circuits, 54(4):992-1002, 2019.

Pan, et al., "A survey on transfer learning", IEEE Transactions on knowledge and data engineering, 22(10):1345-1359, 2009.

Paugam-Moisy, et al., "Delay learning and polychronization for reservoir computing", Neurocomputing, 71 (7-9):1143-1158, 2008.

Maass, et al., Real-time computing without stable states: A new framework for neural computation based on perturbations. Neural computation, 14(11):2531-2560, 2002.

Jaeger, et al., "The "echo state" approach to analysing and training recurrent neural networks-with an erratum note", Bonn, Germany: German National Research Center for Information Technology GMD Technical Report, 148(34):13, 2001.

Huang, "Extreme learning machine: theory and applications", Neurocomputing, 70(1-3):489-501, 2006.

Shrestha, et al., "Approximating back-propagation for a biologically plausible local learning rule in spiking neural hetworks", ICONS, 2019.

Bekolay et al., "A general error-modulated STDP learning rule applied to reinforcement learning in the basal ganglia", Computational and Systems Neuroscience 2011, Jan. 2011 https://www.researchgate.net/publication/262216528_A_general_error-modulated_STDP_learning_rule_applied_to_reinforcement_learning_in_the_basal_ganglia.

Bekolay et al., "A general error-modulated STDP learning rule applied to reinforcement learning in the basal ganglia", Computational and Systems Neuroscience 2011, Jan. 2011 http://compneuro.uwaterloo.ca/publications/bekolay2011.

Gerstner, et al., "Neuronal dynamics: From single neurons to networks and models of cognition", Chapter 19, Cambridge University Press, 2014 https://neuronaldynamics.epfl.ch/online/Ch19.html.

* cited by examiner

300

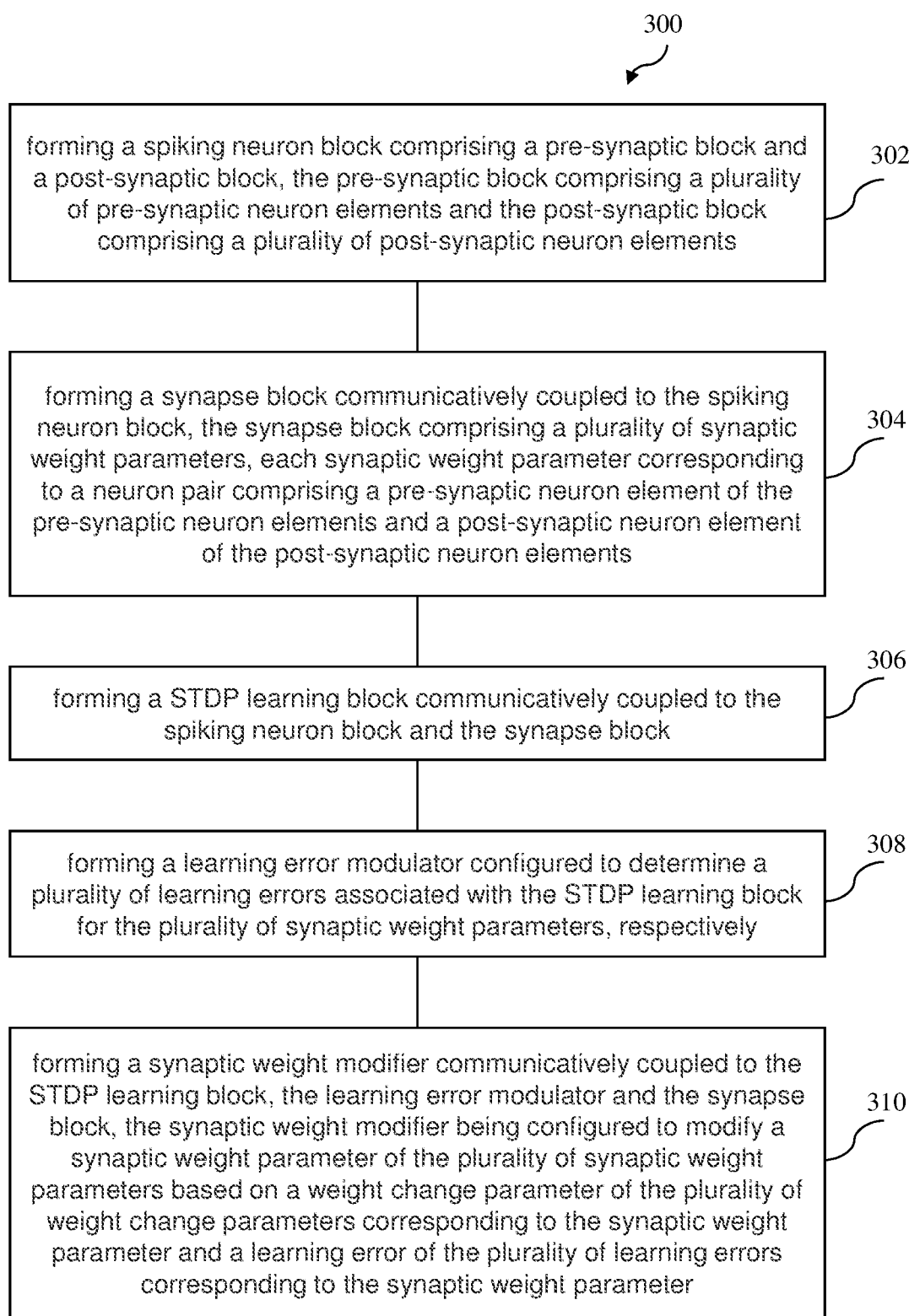

forming a spiking neuron block comprising a pre-synaptic block and a post-synaptic block, the pre-synaptic block comprising a plurality of pre-synaptic neuron elements and the post-synaptic block comprising a plurality of post-synaptic neuron elements ⟶ 302 forming a synapse block communicatively coupled to the spiking neuron block, the synapse block comprising a plurality of synaptic weight parameters, each synaptic weight parameter corresponding to a neuron pair comprising a pre-synaptic neuron element of the pre-synaptic neuron elements and a post-synaptic neuron element of the post-synaptic neuron elements ⟶ 304 forming a STDP learning block communicatively coupled to the spiking neuron block and the synapse block ⟶ 306 forming a learning error modulator configured to determine a plurality of learning errors associated with the STDP learning block for the plurality of synaptic weight parameters, respectively ⟶ 308 forming a synaptic weight modifier communicatively coupled to the STDP learning block, the learning error modulator and the synapse block, the synaptic weight modifier being configured to modify a synaptic weight parameter of the plurality of synaptic weight parameters based on a weight change parameter of the plurality of weight change parameters corresponding to the synaptic weight parameter and a learning error of the plurality of learning errors corresponding to the synaptic weight parameter ⟶ 310

Processor

402

Memory

100

850

NEUROSYNAPTIC PROCESSING CORE WITH SPIKE TIME DEPENDENT PLASTICITY (STDP) LEARNING FOR A SPIKING NEURAL NETWORK

This application is a National Stage Application of PCT/SG2020/050506 filed Aug. 31, 2020, which application is incorporated herein by reference. To the extent appropriate, a claim of priority is made to each of the above disclosed application(s).

TECHNICAL FIELD

The present invention generally relates to a neurosynaptic processing core with spike time dependent plasticity (STDP) learning for a spiking neural network, a method of operating the neurosynaptic processing core and a method of forming the neurosynaptic processing core.

BACKGROUND

Neuromorphic computing is often presented as an alternate computing paradigm. Spiking Neural Networks (SNNs): a massively parallel, interconnected network of spiking neurons (the mathematical abstraction of biological neurons) is at the heart of this concept. The binary, sparse, and event-based nature of communication between two spiking neurons means that these devices exhibit orders of magnitude of energy efficiency compared to using standard activation functions of non-spiking artificial neural networks and therefore are an appealing prospect for edge-based computing. These edge-based systems, once deployed to their own unique environment must be able to adapt themselves to their ever-changing surrounding. On-chip learning enables this fine-tuning ability.

Spike Time Dependent Plasticity (STDP) has been widely observed in neuroscience experiments and is believed to be the underlying process for learning and information storage in the brain. STDP learning rule, as the name suggests, may adjust the synaptic strength based on the input spike times to the synapse and the output spike times of the spiking neuron. It is the biological embodiment of the Hebbian learning rule: neurons that fire together wire together. In STDP learning, when the pre-synaptic spike precedes the post-synaptic spike, the synaptic weight may be increased and when the reverse order of events occurs, the synaptic weight may be decreased. Reverse behavior has also been observed in nature and may be referred to as an Anti-STDP process.

Naturally, STDP learning may be a prime candidate for on-chip learning in SNNs. Therefore, many conventional SNN based systems comprise of solutions which aim at proposing an implementation of the STDP learning rule. However, the STDP process is inherently an unsupervised learning process, and thus indifferent to the SNN's performance to the task at hand.

A need therefore exists to provide a neurosynaptic processing core with STDP learning for a SNN and related methods that seek to overcome, or at least ameliorate, one or more of the deficiencies of conventional SNN based systems for STDP learning, such as but not limited to, enabling or facilitating on-chip STDP learning for a SNN in an efficient and/or effective manner.

SUMMARY

According to a first aspect of the present invention, there is provided a neurosynaptic processing core with spike time dependent plasticity (STDP) learning for a spiking neural network, the neurosynaptic processing core comprising:

a spiking neuron block comprising a pre-synaptic block and a post-synaptic block, the pre-synaptic block comprising a plurality of pre-synaptic elements and the post-synaptic block comprising a plurality of post-synaptic elements;

a synapse block communicatively coupled to the spiking neuron block, the synapse block comprising a plurality of synaptic weight parameters, each synaptic weight parameter corresponding to a neuron pair comprising a pre-synaptic element of the plurality of pre-synaptic elements and a post-synaptic element of the plurality of post-synaptic elements;

a STDP learning block communicatively coupled to the spiking neuron block and the synapse block, the STDP learning block comprising:

a pre-synaptic event accumulator comprising:

a pre-synaptic spike event memory block comprising a plurality of pre-synaptic spike parameters corresponding to the plurality of pre-synaptic elements, respectively, each pre-synaptic spike parameter indicating a measure of one or more pre-synaptic spike events at the corresponding pre-synaptic element; and a pre-synaptic spike parameter modifier configured to modify a pre-synaptic spike parameter of the plurality of pre-synaptic spike parameters based on a first pre-synaptic spike event input from the pre-synaptic block indicating a pre-synaptic spike event at the corresponding pre-synaptic element;

a post-synaptic event accumulator comprising:

a post-synaptic spike event memory block comprising a plurality of post-synaptic spike parameters corresponding to the plurality of post-synaptic elements, respectively, each post-synaptic spike parameter indicating a measure of one or more post-synaptic spike events at the corresponding post-synaptic element; and a post-synaptic spike parameter modifier configured to modify a post-synaptic spike parameter of the plurality of post-synaptic spike parameters based on a first post-synaptic spike event input from the post-synaptic block indicating a post-synaptic spike event at the corresponding post-synaptic element; and a weight change accumulator comprising:

a weight change memory block comprising a plurality of weight change parameters corresponding to the plurality of synaptic weight parameters, respectively; and a weight change parameter modifier configured to modify a weight change parameter of the plurality of weight change parameters based a pre-synaptic spike parameter of the plurality of pre-synaptic spike parameters corresponding to the weight change parameter or a post-synaptic spike parameter of the plurality of post-synaptic spike parameters corresponding to the weight change parameter;

a learning error modulator configured to determine a plurality of learning errors associated with the STDP learning block for the plurality of synaptic weight parameters, respectively; and a synaptic weight modifier communicatively coupled to the STDP learning block, the learning error modulator and the synapse block, the synaptic weight modifier being configured to modify a synaptic weight parameter of the plurality of synaptic weight parameters based on a weight change parameter of the plurality of weight change parameters corresponding to the synaptic weight parameter and a learning error of the plurality of learning errors corresponding to the synaptic weight parameter.

A method of operating a neurosynaptic processing core with STDP learning for a spiking neural network, the neurosynaptic processing core comprising:

a spiking neuron block comprising a pre-synaptic block and a post-synaptic block, the pre-synaptic block comprising a plurality of pre-synaptic elements and the post-synaptic block comprising a plurality of post-synaptic elements;

a synapse block communicatively coupled to the spiking neuron block, the synapse block comprising a plurality of synaptic weight parameters, each synaptic weight parameter corresponding to a neuron pair comprising a pre-synaptic element of the plurality of pre-synaptic elements and a post-synaptic element of the plurality of post-synaptic elements;

a STDP learning block communicatively coupled to the spiking neuron block and the synapse block, the STDP learning block comprising:

a pre-synaptic event accumulator comprising:

a pre-synaptic spike event memory block comprising a plurality of pre-synaptic spike parameters corresponding to the plurality of pre-synaptic elements, respectively, each pre-synaptic spike parameter indicating a measure of one or more pre-synaptic spike events at the corresponding pre-synaptic element; and a pre-synaptic spike parameter modifier configured to modify a pre-synaptic spike parameter of the plurality of pre-synaptic spike parameters based on a first pre-synaptic spike event input from the pre-synaptic block indicating a pre-synaptic spike event at the corresponding pre-synaptic element;

a post-synaptic event accumulator comprising:

a post-synaptic spike event memory block comprising a plurality of post-synaptic spike parameters corresponding to the plurality of post-synaptic elements, respectively, each post-synaptic spike parameter indicating a measure of one or more post-synaptic spike events at the corresponding post-synaptic element; and a post-synaptic spike parameter modifier configured to modify a post-synaptic spike parameter of the plurality of post-synaptic spike parameters based on a first post-synaptic spike event input from the post-synaptic block indicating a post-synaptic spike event at the corresponding post-synaptic element; and a weight change accumulator comprising:

a weight change memory block comprising a plurality of weight change parameters corresponding to the plurality of synaptic weight parameters, respectively; and a weight change parameter modifier configured to modify a weight change parameter of the plurality of weight change parameters based a pre-synaptic spike parameter of the plurality of pre-synaptic spike parameters corresponding to the weight change parameter or a post-synaptic spike parameter of the plurality of post-synaptic spike parameters corresponding to the weight change parameter;

a learning error modulator configured to determine a plurality of learning errors associated with the STDP learning block for the plurality of synaptic weight parameters, respectively; and a synaptic weight modifier communicatively coupled to the STDP learning block, the learning error modulator and the synapse block, the synaptic weight modifier being configured to modify a synaptic weight parameter of the plurality of synaptic weight parameters based on a weight change parameter of the plurality of weight change parameters corresponding to the synaptic weight parameter and a learning error of the plurality of learning errors corresponding to the synaptic weight parameter, and the method comprising:

triggering the pre-synaptic event accumulator, the post-synaptic event accumulator and the weight change accumulator based on a first trigger signal associated with a first time step iteratively during the STDP learning; and triggering the learning error modulator and the synaptic weight modifier based on a second trigger signal.

A method of forming a neurosynaptic processing core with STDP learning for a spiking neural network, the method comprising:

forming a spiking neuron block comprising a pre-synaptic block and a post-synaptic block, the pre-synaptic block comprising a plurality of pre-synaptic elements and the post-synaptic block comprising a plurality of post-synaptic elements;

forming a synapse block communicatively coupled to the spiking neuron block, the synapse block comprising a plurality of synaptic weight parameters, each synaptic weight parameter corresponding to a neuron pair comprising a pre-synaptic element of the plurality of pre-synaptic elements and a post-synaptic element of the plurality of post-synaptic elements;

forming a STDP learning block communicatively coupled to the spiking neuron block and the synapse block, the STDP learning block comprising:

a pre-synaptic event accumulator comprising:

a pre-synaptic spike event memory block comprising a plurality of pre-synaptic spike parameters corresponding to the plurality of pre-synaptic elements, respectively, each pre-synaptic spike parameter indicating a measure of one or more pre-synaptic spike events at the corresponding pre-synaptic element; and a pre-synaptic spike parameter modifier configured to modify a pre-synaptic spike parameter of the plurality of pre-synaptic spike parameters based on a first pre-synaptic spike event input from the pre-synaptic block indicating a pre-synaptic spike event at the corresponding pre-synaptic element;

a post-synaptic event accumulator comprising:

a post-synaptic spike event memory block comprising a plurality of post-synaptic spike parameters corresponding to the plurality of post-synaptic elements, respectively, each post-synaptic spike parameter indicating a measure of one or more post-synaptic spike events at the corresponding post-synaptic element; and a post-synaptic spike parameter modifier configured to modify a post-synaptic spike parameter of the plurality of post-synaptic spike parameters based on a first post-synaptic spike event input from the post-synaptic block indicating a post-synaptic spike event at the corresponding post-synaptic element; and a weight change accumulator comprising:

a weight change memory block comprising a plurality of weight change parameters corresponding to the plurality of synaptic weight parameters, respectively; and a weight change parameter modifier configured to modify a weight change parameter of the plurality of weight change parameters based a pre-synaptic spike parameter of the plurality of pre-synaptic spike parameters corresponding to the weight change parameter or a post-synaptic spike parameter of the plurality of post-synaptic spike parameters corresponding to the weight change parameter;

forming a learning error modulator configured to determine a plurality of learning errors associated with the STDP learning block for the plurality of synaptic weight parameters, respectively; and forming a synaptic weight modifier communicatively coupled to the STDP learning block, the learning error modulator and the synapse block, the synaptic weight modifier being configured to modify a synaptic weight parameter of the plurality of synaptic weight parameters based on a weight change parameter of the plurality of weight change parameters corresponding to the synaptic weight parameter and a learning error of the plurality of learning errors corresponding to the synaptic weight parameter.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 3 depicts a schematic flow diagram of a method of forming a neurosynaptic processing core with STDP learning for a spiking neural network, according to various embodiments of the present invention, the neurosynaptic processing core being the neurosynaptic processing core as described with reference to FIG. 1;

DETAILED DESCRIPTION

Various embodiments of the present invention provide a neurosynaptic processing core with spike time dependent plasticity (STDP) learning for a spiking neural network (SNN) (i.e., an artificial SNN), a method of operating the neurosynaptic processing core and a method of forming the neurosynaptic processing core.

As described in the background, for example, many conventional SNN based systems comprise of solutions which aim at proposing an implementation of the STDP learning rule. However, the STDP process is inherently an unsupervised learning process, and thus indifferent to the SNN's performance to the task at hand. Accordingly, various embodiments of the present invention provide a neurosynaptic processing core with STDP learning for a SNN and related methods that seek to overcome, or at least ameliorate, one or more of the deficiencies of conventional SNN based systems for STDP learning, such as but not limited to, enabling or facilitating on-chip STDP learning for a SNN in an efficient and/or effective manner.

Figure 1:
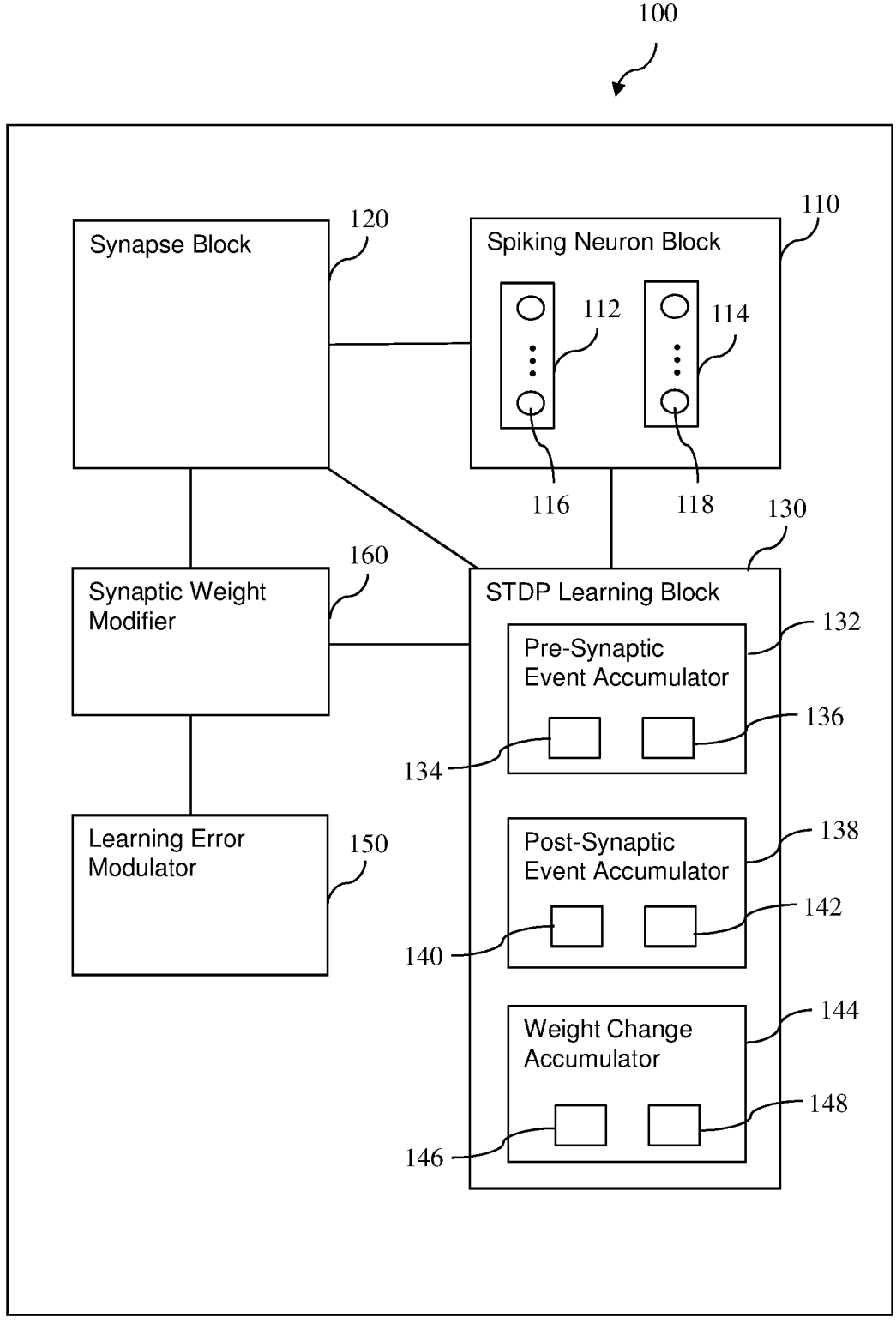
FIG. 1 depicts a schematic drawing of a neurosynaptic processing core with STDP learning for a spiking neural network, according to various embodiments of the present invention.

FIG. 1 depicts a schematic drawing of a neurosynaptic processing core 100 with STDP learning for a SNN according to various embodiments of the present invention. The neurosynaptic processing core 100 comprises: a spiking neuron block 110 comprising a pre-synaptic block 112 and a post-synaptic block 114, the pre-synaptic block 112 comprising a plurality of pre-synaptic elements 116 and the post-synaptic block 114 comprising a plurality of post-synaptic elements 118; and a synapse block 120 communicatively coupled to the spiking neuron block 110, the synapse block 120 comprising a plurality of synaptic weight parameters, each synaptic weight parameter corresponding to a neuron pair comprising a pre-synaptic element of the plurality of pre-synaptic elements 116 and a post-synaptic element of the plurality of post-synaptic elements 118. The neurosynaptic processing core 100 further comprises a STDP learning block 130 communicatively coupled to the spiking neuron block 110 and the synapse block 120, the STDP learning block 130 comprising: a pre-synaptic event accumulator 132 comprising: a pre-synaptic spike event memory block 134 comprising a plurality of pre-synaptic spike parameters corresponding to the plurality of pre-synaptic elements 116, respectively, each pre-synaptic spike parameter indicating a measure of one or more pre-synaptic spike events at the corresponding pre-synaptic element 116; and a pre-synaptic spike parameter modifier 136 configured to modify a pre-synaptic spike parameter of the plurality of pre-synaptic spike parameters based on a first pre-synaptic spike event input from the pre-synaptic block 112 indicating a pre-synaptic spike event at the corresponding pre-synaptic element 116; a post-synaptic event accumulator 138 comprising: a post-synaptic spike event memory block 140 comprising a plurality of post-synaptic spike parameters corresponding to the plurality of post-synaptic elements 118, respectively, each post-synaptic spike parameter indicating a measure of one or more post-synaptic spike events at the corresponding post-synaptic element 118; and a post-synaptic spike parameter modifier 142 configured to modify a post-synaptic spike parameter of the plurality of post-synaptic spike parameters 118 based on a first post-synaptic spike event input from the post-synaptic block 114 indicating a post-synaptic spike event at the corresponding post-synaptic element 118; and a weight change accumulator 144 comprising: a weight change memory block 146 comprising a plurality of weight change parameters corresponding to the plurality of synaptic weight parameters, respectively; and a weight change parameter modifier 148 configured to modify a weight change parameter of the plurality of weight change parameters based a pre-synaptic spike parameter of the plurality of pre-synaptic spike parameters corresponding to the weight change parameter or a post-synaptic spike parameter of the plurality of post-synaptic spike parameters corresponding to the weight change parameter. The neurosynaptic processing core 100 further comprises a learning error modulator 150 configured to determine a plurality of learning errors associated with the STDP learning block for the plurality of synaptic weight parameters, respectively; and a synaptic weight modifier 160 communicatively coupled to the STDP learning block 130, the learning error modulator 150 and the synapse block 120, the synaptic weight modifier 160 being configured to modify a synaptic weight parameter of the plurality of synaptic weight parameters based on a weight change parameter of the plurality of weight change parameters corresponding to the synaptic weight parameter and a learning error of the plurality of learning errors corresponding to the synaptic weight parameter.

Accordingly, the neurosynaptic processing core 100 is advantageously configured for enabling or facilitating on-chip STDP learning for a SNN in an efficient and/or effective manner, and more particularly, with error modulated STDP learning for improving adaptability, reliability and/or accuracy in STDP learning. These advantages or technical effects will become more apparent to a person skilled in the art as the neurosynaptic processing core 100 is described in more detail according to various embodiments or example embodiments of the present invention.

In various embodiments, the synapse block 120 comprises a plurality of synapse elements, each synapse element comprising a synaptic weight parameter of the plurality of synaptic weight parameters corresponding thereto and corresponds to the neuron pair corresponding to the synaptic weight parameter.

In various embodiments, the plurality of synapse elements are configured as a crossbar memory array, each synapse element being arranged at a corresponding cross-point of crossbar memory array.

In various embodiments, the pre-synaptic spike parameter modifier 136 comprises a pre-synaptic spike parameter incrementor configured to increment the pre-synaptic spike parameter based on the first pre-synaptic spike event input received from the pre-synaptic block 112, and the post-synaptic spike parameter modifier 142 comprises a post-synaptic spike parameter incrementor configured to increment the post-synaptic spike parameter based on the first post-synaptic spike event input received from the post-synaptic block 114.

In various embodiments, the pre-synaptic spike parameter modifier 136 further comprises a pre-synaptic spike parameter decrementor configured to decrement the pre-synaptic spike parameter, and the post-synaptic spike parameter modifier 142 further comprises a post-synaptic spike parameter decrementor configured to decrement the post-synaptic spike parameter.

In various embodiments, the above-mentioned each pre-synaptic spike parameter indicates a pre-synaptic trace of the one or more pre-synaptic spike events at the corresponding pre-synaptic element 116, the pre-synaptic spike parameter incrementor is configured to increment the pre-synaptic spike parameter based on a first incremental value, and the pre-synaptic spike parameter decrementor is configured to decrement the pre-synaptic spike parameter based on a first decremental value.

In various embodiments, the above-mentioned each post-synaptic spike parameter indicates a post-synaptic trace of the one or more post-synaptic spike events at the corresponding post-synaptic element 118, the post-synaptic spike parameter incrementor is configured to increment the post-synaptic spike parameter based on a second incremental value, and the post-synaptic spike parameter decrementor is configured to decrement the post-synaptic spike parameter based on a second decremental value.

In various embodiments, the weight change accumulator 144 further comprises a synaptic spike event selector configured to select the pre-synaptic spike parameter from the pre-synaptic spike event memory block 134 for output to the weight change parameter modifier 148 based on a second post-synaptic spike event input from the post-synaptic block 114 indicating the post-synaptic spike event at the corresponding post-synaptic element 118 or select the post-synaptic spike parameter from the post-synaptic spike event memory block 140 for output to the weight change parameter modifier 148 based on a second pre-synaptic spike event input from the pre-synaptic block 112 indicating the pre-synaptic spike event at the corresponding pre-synaptic element 116.

In various embodiments, the weight change parameter modifier 148 is configured to increment the weight change parameter based on the pre-synaptic spike parameter received from the synaptic spike event selector or decrement the weight change parameter based on the post-synaptic spike parameter received from the synaptic spike event selector.

In various embodiments, the learning error modulator 150 comprises: a learning error determiner configured to determine the plurality of learning errors for the plurality of synaptic weight parameters, respectively; and a learning error evaluator configured to determine a learning error outcome for the synaptic weight parameter based on a learning error of the plurality of learning errors corresponding to the synaptic weight parameter. In various embodiments, the synaptic weight modifier 160 is configured to modify the synaptic weight parameter of the plurality of synaptic weight parameters based on the weight change parameter received from the weight change accumulator 144 corresponding to the synaptic weight parameter and the learning error outcome received from the learning error modulator 150 corresponding to the synaptic weight parameter.

In various embodiments, the learning error modulator 150 further comprises a synaptic spike event record block comprising a plurality of post-synaptic spike event record parameters for the plurality of post-synaptic spike elements 118, respectively, each post-synaptic spike event record parameter indicating a number of post-synaptic spike events that occurred at the corresponding post-synaptic element 118. In various embodiments, the learning error determiner is configured to determine, for each of the plurality of synaptic weight parameters, the learning error for the synaptic weight parameter based on the post-synaptic spike event record parameter for the post-synaptic element 118 corresponding to the synaptic weight parameter and a reference parameter for the post-synaptic element 118 corresponding to the synaptic weight parameter.

In various embodiments, the synaptic weight modifier 160 comprises a weight change determiner configured to determine a second weight change parameter for modifying the synaptic weight parameter based on the first weight change parameter received from the weight change accumulator 144 corresponding to the synaptic weight parameter and the learning error outcome received from the learning error modulator 150 corresponding to the synaptic weight parameter.

In various embodiments, the pre-synaptic event accumulator 132, the post-synaptic event accumulator 138 and the weight change accumulator 144 are each configured to be triggered based on a first trigger signal associated with a first time step iteratively (e.g., periodically) during the STDP learning. In various embodiments, the learning error modulator 150 and the synaptic weight modifier 160 are each configured to be triggered based on a second trigger signal.

In various embodiments, the pre-synaptic spike parameter incrementor of the pre-synaptic event accumulator 132 is configured to be triggered based on the first trigger signal to receive the first pre-synaptic spike event input from the pre-synaptic block 112 so as to increment the pre-synaptic spike parameter based on the first pre-synaptic spike event input received. In various embodiments, the post-synaptic spike parameter incrementor of the post-synaptic event accumulator 138 is configured to be triggered based on the first trigger signal to receive the first post-synaptic spike event input from the post-synaptic block 114 so as to increment the post-synaptic spike parameter based on the first post-synaptic spike event input received. In various embodiments, the synaptic spike event selector of the weight change accumulator 144 is configured to be triggered based on the first trigger signal: to receive the second pre-synaptic spike event input from the pre-synaptic block 112 so as to select the post-synaptic spike parameter from the post-synaptic spike event memory block 140 for output to the weight change parameter modifier 148 based on the second pre-synaptic spike event input received, or to receive the second post-synaptic spike event input from the post-synaptic block 114 so as to select the pre-synaptic spike parameter from the pre-synaptic spike event memory block 134 for output to the weight change parameter modifier 148 based on the second post-synaptic spike event input received.

In various embodiments, one or more of the plurality of post-synaptic elements 118 corresponds to one or more spiking neurons in a layer of the SNN.

In various embodiments, the above-mentioned layer is an output layer of the SNN.

Figure 2:
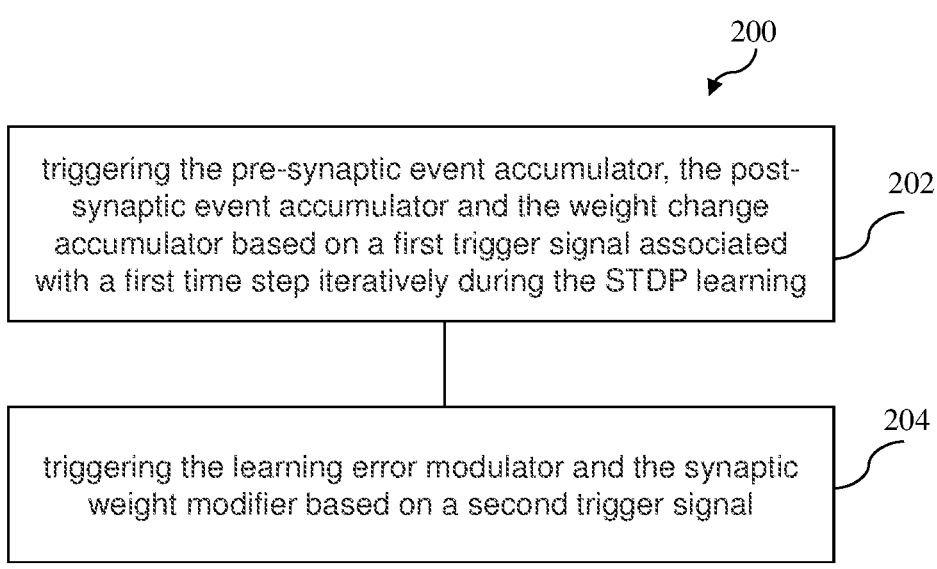
FIG. 2 depicts a schematic flow diagram of a method of operating a neurosynaptic processing core with STDP learning for a spiking neural network, according to various embodiments of the present invention, the neurosynaptic processing core being the neurosynaptic processing core as described with reference to FIG. 1.

FIG. 2 depicts a schematic flow diagram of a method 200 of operating a neurosynaptic processing core with STDP learning for a SNN according to various embodiments of the present invention, the neurosynaptic processing core being the neurosynaptic processing core 100 as described hereinbefore with reference to FIG. 1 according to various embodiments.

The method 200 comprises: triggering (at 202) the pre-synaptic event accumulator 132, the post-synaptic event accumulator 138 and the weight change accumulator 144 based on a first trigger signal associated with a first time step iteratively during the STDP learning; and triggering (at 204) the learning error modulator 150 and the synaptic weight modifier 160 based on a second trigger signal.

In various embodiments, the above-mentioned triggering the pre-synaptic event accumulator 132 comprises triggering the pre-synaptic spike parameter incrementor of the pre-synaptic event accumulator 132 based on the first trigger signal to receive the first pre-synaptic spike event input from the pre-synaptic block 112 so as to increment the pre-synaptic spike parameter based on the first pre-synaptic spike event input received. In various embodiments, the above-mentioned triggering the post-synaptic event accumulator 138 comprises triggering the post-synaptic spike parameter incrementor of the post-synaptic event accumulator 138 based on the first trigger signal to receive the first post-synaptic spike event input from the post-synaptic block 114 so as to increment the post-synaptic spike parameter based on the first post-synaptic spike event input received. In various embodiments, the above-mentioned triggering the weight change accumulator 144 comprises triggering the synaptic spike event selector of the weight change accumulator 144 based on the first trigger signal to: receive the second post-synaptic spike event input from the post-synaptic block 114 so as to select the pre-synaptic spike parameter from the pre-synaptic spike event memory block 134 for output to the weight change parameter modifier 148 based on the second post-synaptic spike event input received, or to receive the second pre-synaptic spike event input from the pre-synaptic block 112 so as to select the post-synaptic spike parameter from the post-synaptic spike event memory block 138 for output to the weight change parameter modifier 148 based on the second pre-synaptic spike event input received.

In various embodiments, the above-mentioned triggering the learning error modulator 150 comprising triggering the learning error determiner of the learning error modulator 150 based on the second trigger signal to determine the plurality of learning errors for the plurality of synaptic weight parameters, respectively. The learning error determiner is configured to determine, for each of the plurality of synaptic weight parameters, the learning error for the synaptic weight parameter based on the post-synaptic spike event record parameter for the post-synaptic element 118 corresponding to the synaptic weight parameter and a reference parameter for the post-synaptic element 118 corresponding to the synaptic weight parameter.

In various embodiments, the synaptic weight modifier 160 comprises a weight change determiner configured to determine a second weight change parameter for modifying the synaptic weight parameter based on the first weight change parameter received from the weight change accumulator 144 corresponding to the synaptic weight parameter and the learning error outcome received from the learning error modulator 150 corresponding to the synaptic weight parameter.

In various embodiments, the above-mentioned triggering the synaptic weight modifier 160 comprises triggering the synaptic weight modifier 160 based on the second trigger signal to modify the synaptic weight parameter based on the first weight change parameter received from the weight change accumulator 144 corresponding to the synaptic weight parameter and the learning error outcome received from the learning error modulator 150 corresponding to the synaptic weight parameter.

FIG. 3 depicts a schematic flow diagram of a method 300 of forming a neurosynaptic processing core with STDP learning for a SNN according to various embodiments of the present invention, the neurosynaptic processing core being the neurosynaptic processing core 100 as described hereinbefore with reference to FIG. 1 according to various embodiments. The method 300 comprises: forming (at 302) a spiking neuron block 110 comprising a pre-synaptic block 112 and a post-synaptic block 114, the pre-synaptic block 112 comprising a plurality of pre-synaptic elements 116 and the post-synaptic block 114 comprising a plurality of post-synaptic elements 118; and forming (at 304) a synapse block 120 communicatively coupled to the spiking neuron block 110, the synapse block 120 comprising a plurality of synaptic weight parameters, each synaptic weight parameter corresponding to a neuron pair comprising a pre-synaptic element of the plurality of pre-synaptic elements 116 and a post-synaptic element of the plurality of post-synaptic elements 118. The method 300 further comprises forming (at 306) a STDP learning block 130 communicatively coupled to the spiking neuron block 110 and the synapse block 120, the STDP learning block 130 comprising: a pre-synaptic event accumulator 132 comprising: a pre-synaptic spike event memory block 134 comprising a plurality of pre-synaptic spike parameters corresponding to the plurality of pre-synaptic elements 116, respectively, each pre-synaptic spike parameter indicating a measure of one or more pre-synaptic spike events at the corresponding pre-synaptic element 116; and a pre-synaptic spike parameter modifier 136 configured to modify a pre-synaptic spike parameter of the plurality of pre-synaptic spike parameters 116 based on a first pre-synaptic spike event input from the pre-synaptic block 112 indicating a pre-synaptic spike event at the corresponding pre-synaptic element 116; a post-synaptic event accumulator 138 comprising: a post-synaptic spike event memory block 140 comprising a plurality of post-synaptic spike parameters corresponding to the plurality of post-synaptic elements 118, respectively, each post-synaptic spike parameter indicating a measure of one or more post-synaptic spike events at the corresponding post-synaptic element 118; and a post-synaptic spike parameter modifier 142 configured to modify a post-synaptic spike parameter of the plurality of post-synaptic spike parameters based on a first post-synaptic spike event input from the post-synaptic block 114 indicating a post-synaptic spike event at the corresponding post-synaptic element 118; and a weight change accumulator 144 comprising: a weight change memory block 146 comprising a plurality of weight change parameters corresponding to the plurality of synaptic weight parameters, respectively; and a weight change parameter modifier 148 configured to modify a weight change parameter of the plurality of weight change parameters based a pre-synaptic spike parameter of the plurality of pre-synaptic spike parameters corresponding to the weight change parameter or a post-synaptic spike parameter of the plurality of post-synaptic spike parameters corresponding to the weight change parameter. The method 300 further comprises forming (at 308) a learning error modulator 150 configured to determine a plurality of learning errors associated with the STDP learning block 130 for the plurality of synaptic weight parameters, respectively; and forming (at 310) a synaptic weight modifier 160 communicatively coupled to the STDP learning block 130, the learning error modulator 150 and the synapse block 120, the synaptic weight modifier 160 being configured to modify a synaptic weight parameter of the plurality of synaptic weight parameters based on a weight change parameter of the plurality of weight change parameters corresponding to the synaptic weight parameter and a learning error of the plurality of learning errors corresponding to the synaptic weight parameter.

In various embodiments, the neurosynaptic processing core 100 may be formed using a plurality of processors (or processing units) with memory structures (or memories) that function as the neurons and synapses. For example, the communication between the processors (or processing units) and the memories may be established using simple temporal message which is typically in spikes form. For example, the neurosynaptic processing core 100 may be formed or fabricated (e.g., the method 300 of forming a neurosynaptic processing core may be performed) using commercially available CMOS technologies, such as at a semiconductor foundry. By way of an example only and without limitation, the neurosynaptic processing core 100 may be fabricated using UMC (United Microelectronics Corporation) 40 nm CMOS technology.

Figure 4:
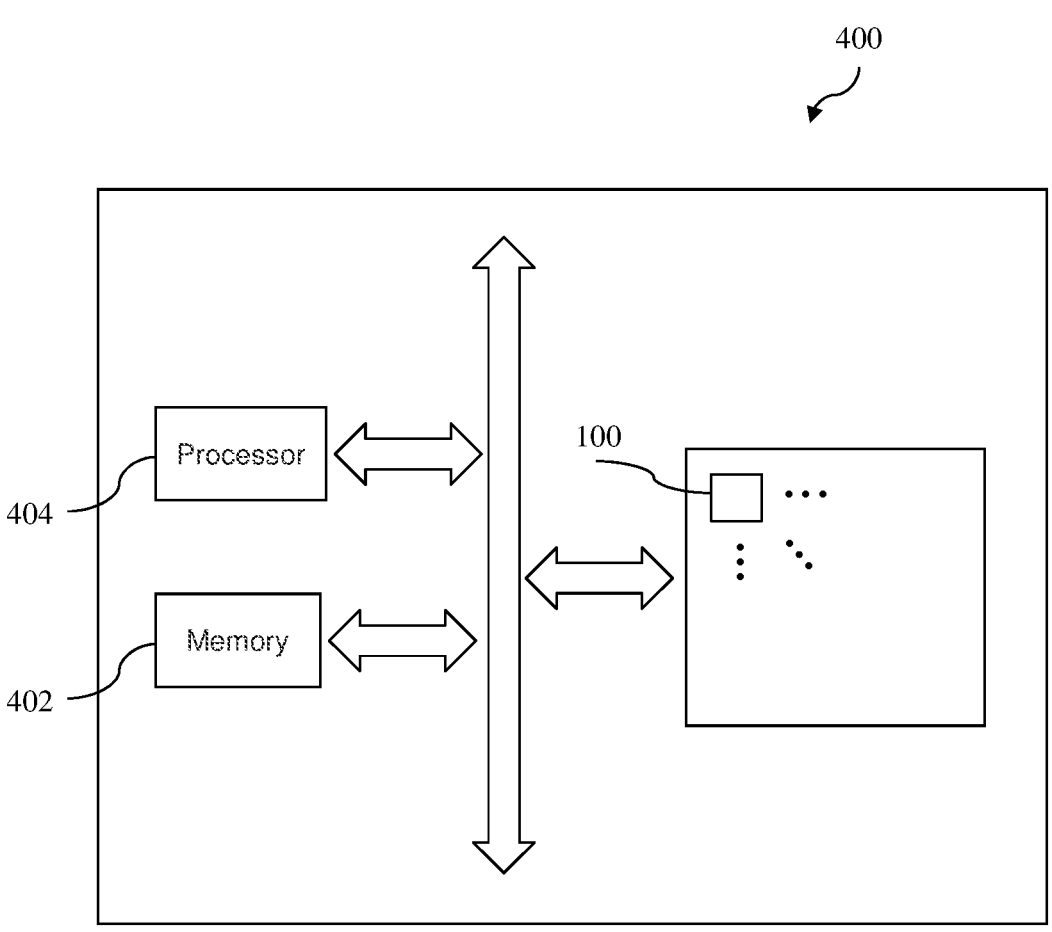
FIG. 4 depicts a neurosynaptic processing system with STDP learning for a spiking neural network, according to various embodiments of the present invention.

FIG. 4 depicts a neurosynaptic processing system 400 with STDP learning for a SNN according to various embodiments of the present invention. The neurosynaptic processing system 400 comprises one or more neurosynaptic processing cores, each neurosynaptic processing core being the neurosynaptic processing core 100 as described hereinbefore with reference to FIG. 1 according to various embodiments; a memory 402; and at least one processor 404 communicatively coupled to the memory 402 and the one or more neurosynaptic processing cores 100 and configured to coordinate the one or more neurosynaptic processing cores 100 for performing STDP learning for the SNN.

In various embodiments, the neurosynaptic processing system 400 may be formed as an integrated processing circuit. The neurosynaptic processing system 400 may also be embodied as a device or an apparatus.

A computing system, a controller, a microcontroller or any other system providing a processing capability may be presented according to various embodiments in the present disclosure. Such a system may be taken to include one or more processors and one or more computer-readable storage mediums. For example, the neurosynaptic processing system 400 described hereinbefore may include a number of processing units (e.g., processor(s) 404 and neurosynaptic processing core(s) 100) and one or more computer-readable storage medium (or memory) 402 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "modify", "increment", "decrement", "select", "determine", "trigger", "receive" or the like, refer to the actions and processes of a computer system, or similar electronic device, that manipulates and transforms data represented as physical quantities within the computer system into other data similarly represented as physical quantities within the computer system.

The present specification also discloses a system (e.g., which may also be embodied as a device or an apparatus) for performing the operations/functions of the method(s) described herein. Such a system or apparatus may be specially constructed for the required purposes, or may comprise a general purpose computer or other device selectively activated or reconfigured by a computer program stored in the computer. The algorithms presented herein are not inherently related to any particular computer or other apparatus. Various general purpose machines may be used with computer programs in accordance with the teachings herein.

Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the methods/techniques of the disclosure contained herein. Moreover, the computer program is not intended to be limited to any particular control flow. There are many other variants of the computer program, which can use different control flows without departing from the spirit or scope of the invention. It will be appreciated to a person skilled in the art that various modules may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of the computer program/module or method may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions executable by one or more computer processors (e.g., the processor(s) 404) to perform a method 200 of operating a neurosynaptic processing core with STDP learning for a SNN as described hereinbefore with reference to FIG. 2. Accordingly, various computer programs or modules described herein may be stored in a computer program product receivable by a system therein for execution by at least one processor 404 of the system to perform the respective functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules. Accordingly, in various embodiments, the neurosynaptic processing core 100 (e.g., components, blocks or modules therein) may be implemented in software or hardware, or a combination (e.g., a co-design) of both software and hardware in order to suit or accommodate different applications' requirements. By way of an example only and without limitation, in edge devices (or front-end devices), neuromorphic processor with low power consumption may be needed or preferred to execute energy-constrained applications. In such applications, for example, the core computation (e.g., the spiking neuron block 110 and the synapse block 120 may be implemented in hardware). On the other hand, for example, learning functionality, which is complex in its computation and is not as frequently operated as the core computation, may be implemented in software. In this regard, components or modules that are related to the learning functionality may include, for example, the STDP learning block 130, the synaptic weight modifier 160 and the learning error modulator 150.

Figure 5:
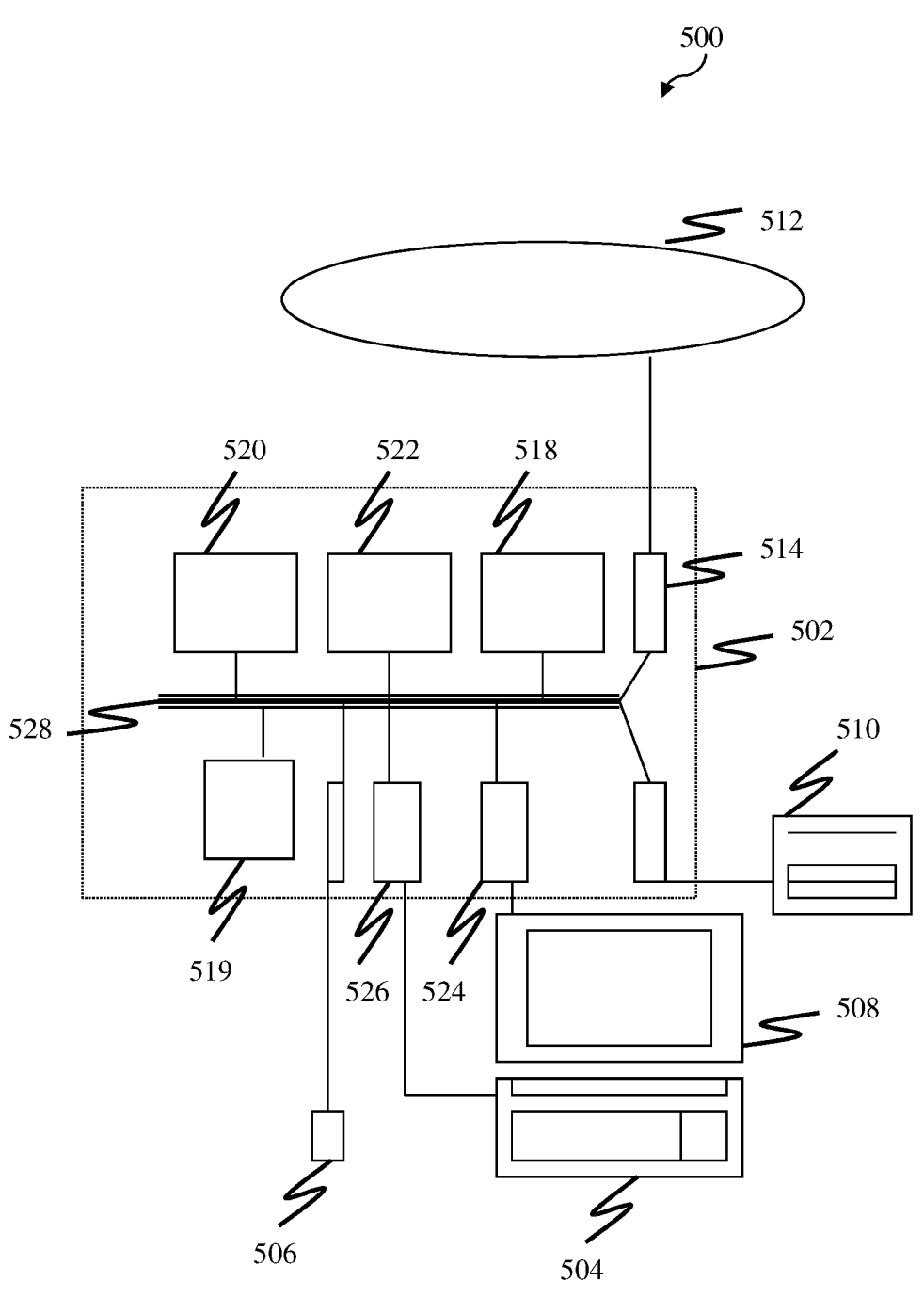
FIG. 5 depicts an example computer system which the neural network processor system as described with reference to FIG. 2 may be embodied in, by way of an example only.

In various embodiments, the neural network processor system 400 may be realized by any computer system (e.g., portable or desktop computer system, such as tablet computers, laptop computers, mobile communications devices (e.g., smart phones), and so on) including at least one processor, a memory and the neurosynaptic processing core(s) 100 configured as described hereinbefore according to various embodiments, such as a computer system 500 as schematically shown in FIG. 5 as an example only and without limitation. Various methods/steps or functional modules may be implemented as software, such as a computer program (e.g., one or more neural network applications) being executed within the computer system 500, and instructing the computer system 500 (in particular, one or more processors therein) to conduct the methods/functions of various embodiments described herein. The computer system 500 may comprise a computer module 502, input modules, such as a keyboard 504 and a mouse 506, and a plurality of output devices such as a display 508, and a printer 510. The computer module 502 may be connected to a computer network 512 via a suitable transceiver device 514, to enable access to e.g., the Internet or other network systems such as Local Area Network (LAN) or Wide Area Network (WAN). The computer module 502 in the example may include a processor 518 (e.g., corresponding to the processor 404 as described herein according to various embodiments) for executing various instructions (e.g., neural network application(s)), neurosynaptic processing core(s) 519 (e.g., corresponding to the neurosynaptic processing core(s) 100 as described herein according to various embodiments), a Random Access Memory (RAM) 520 and a Read Only Memory (ROM) 522. The computer module 502 may also include a number of Input/Output (I/O) interfaces, for example I/O interface 524 to the display 508, and I/O interface 526 to the keyboard 504. The components of the computer module 502 typically communicate via an interconnected bus 528 and in a manner known to the person skilled in the relevant art.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first," "second," and so forth does not limit the quantity or order of such elements or features. For example, such designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any single item therein or any combination of two or more items therein.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Various example embodiments provide a neurosynaptic core with on-chip learning (e.g., corresponding to the neurosynaptic processing core 100 as described hereinbefore according to various embodiments) and a method of operating the neurosynaptic core (e.g., corresponding to the method 200 of operating a neurosynaptic processing core 100 as described hereinbefore according to various embodiments).

In particular, various example embodiments provide neurosynaptic core design with on-chip learning in a SNN. Various example embodiments provide an architectural design approach and the operation method that exhibit effective on-chip learning capability using error modulated STDP rule. For example and without limitation, there may be two key differentiations between the neuromorphic SNN system (e.g., corresponding to the neurosynaptic processing system 400 as described hereinbefore according to various embodiments), including one or more neurosynaptic cores, according to various example embodiments and conventional existing neuromorphic SNN systems with STDP based learning rule. First, the design may be integrated with supervised learning error that toggles between STDP and Anti-STDP processes. Second, the design may be a method for the neuromorphic SNN system to achieve the required network learning outcome with (at least) single learning neurosynaptic core. In addition to that, the neurosynaptic core according to various example embodiments may include three key features. The architecture may be adaptable to neuromorphic SNN system with homogeneous or heterogeneous network configurations. It may have duo on-chip operational modes, which are inference (without learning) mode and learning mode. The neurosynaptic core according to various example embodiments also provides flexibility as it supports configurable numbers of learning neurons in order to cater to the various applications' requirement. Overall, various example embodiments may provide an intuitive hardware solution for SNN that supports transfer learning and having the feasibility to learn/relearn new tasks without catastrophic forgetting.

Various example embodiments use the supervised learning error to modulate the STDP weight update. As an example, the use of supervised learning error to toggle between STDP and Anti-STDP process differentiates the method according to various example embodiments from conventional STDP based learning rules. This learning mechanism that is presented according to various example embodiments may be referred to as an error modulated STDP learning rule. In various example embodiments, the error modulation may involve an error term, a pre-synaptic term and a post-synaptic term.

Various example embodiments may train the last layer of a pre-trained network to quickly learn to adapt to a new task in the domain of transfer learning. In this regard, various example embodiments may follow this modality and focus on learning only on a few neurosynaptic cores that represent the output layer neurons to strike a balance between the adaptability of the SNN and the on-chip learning overhead. The method or algorithm description and the learning neurosynaptic core architecture, which serves a key building block of a modular neuromorphic SNN with error modulated STDP capability, will be described hereinafter according to various example embodiments of the present invention.

Learning with Error Modulated STDP

Figure 6:
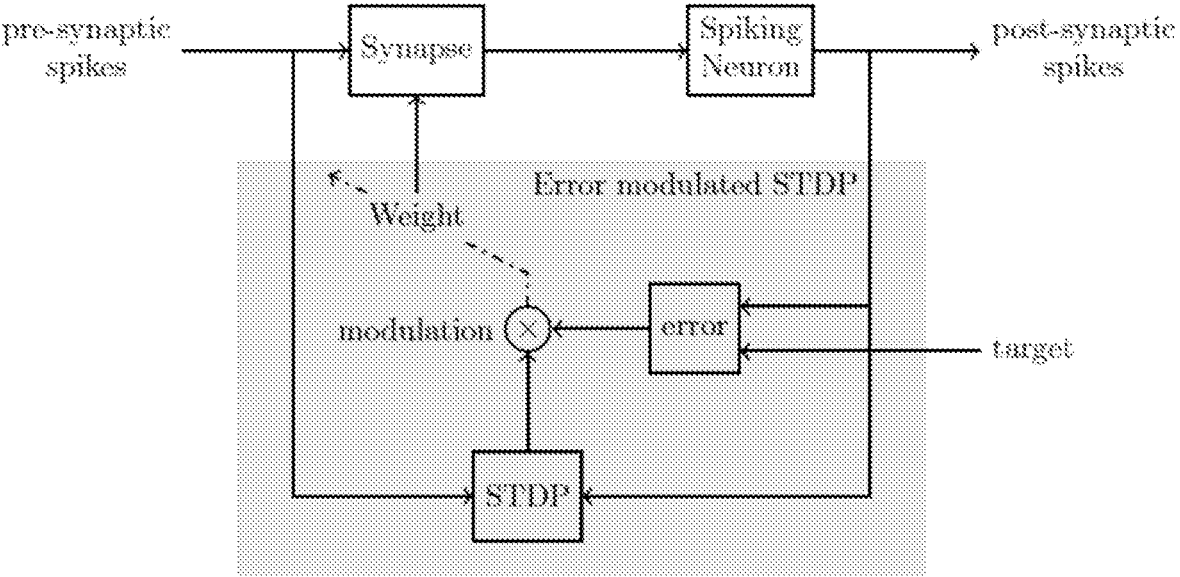
FIG. 6 depicts a high-level block diagram of an error modulated STDP learning method, according to various example embodiments of the present invention.

The algorithmic details of the error modulated STDP learning method (or learning rule) according to various example embodiments of the present invention will now be described. Unlike conventional STDP based learning method, various example embodiments use supervised learning error to modulate the STDP learning process. In various example embodiments, based on the state of the current error, the learning process is modulated between STDP learning and Anti-STDP learning. For example, the modulation may be performed based on the sign of the error determined. By way of an example only, if the error is positive, the process may be at the STDP learning mode or state (e.g., remains at STDP learning) and if the error is negative, the process may be at the anti-STDP learning mode or state (e.g., changes to the anti-STDP learning). In this regard, in the case of anti-STDP learning, post followed by pre would cause a decrease in weight, whereas pre followed by post would cause an increase in weight, that is, the reverse behavior in STDP process. Furthermore, the magnitude of the error may also modulate the degree of weight increment or decrement, for example, for same pre and post spike times, a larger error results in a larger weight change. It follows that when there is zero error, there is no weight change. Accordingly, this learning method according to various example embodiments enables the ability to learn the synaptic weights in the neurosynaptic processing core and to adapt to, for example, new environment, change of the task, device variance, and so on, and still maintain a good performance of the SNN. According to various example embodiments, the algorithm may be applied only to the output layer of the SNN. For illustration purpose only and without limitation, a high-level block diagram of the error modulated STDP learning method is shown in FIG. 6 according to various example embodiments of the present invention.

Learning Method/Algorithm

Denote an SNN with $\mathcal{N}$. For a given set of input spikes, $s_{in}$, the objective of this network is to learn to output spike, $s_{out}(t)=\mathcal{N}(s_{in})$, with some desired property, $y=h(s_{out}(t))$ that is close, ideally equal, to the target statistics $\hat{y}$.

SNN feature extractor: According to various example embodiments, the method may be applied for learning the weights of the last/output layer. The network $\mathcal{N}$, however, can have multiple layers or even recurrent connections. Denote the network without the output layer of neurons as $\mathcal{N}_{-1}$. Then $s_{pre}(t)=\mathcal{N}_{-1}(s_{in}(t))$ is the spiking feature which is also the presynaptic input to the last spiking layer. Although not necessary, $\mathcal{N}_{-1}$ may be pre-trained with some offline training method and used in a transfer learning scenario. Other options are a random pool of neurons in the form of Echo State Network, Liquid State Machine, spiking version of Extreme Learning Machine, and so on, as disclosed and known in the art or the spiking input, $s_{in}(t)$ itself.

Synapse and Weight: A synapse may comprise a representation of weight of the network. For example, the synaptic weights of the last layer is to be learned, which may be denoted by the matrix W, or the individual element may be denoted by $w_{ji}$. The synapse takes the input spikes and outputs weighted spike, $w_{ji}s_i(t)$.

Spiking Neuron: A spiking neuron is a spike generation mechanism, which may be any model of a spiking neuron, such as but not limited to, a simple Leaky Integrate and Fire neuron, spike response neuron, Izhikevich neuron, and so on. The spiking neuron may take weighted spikes $w_{ji}s_i(t)$ and produce the post-synaptic spike of the layer $s_j(t)=s_{post}(t)$. In the last layer of the network, the spiking neuron may produce the output of the network, $s_{out}(t)$. In various example embodiments, with reference to FIG. 1, each pre-synaptic element 116 may refer or correspond to a pre-synaptic spike to the neurosynaptic processing core 100, for example, a spike arriving at the pre-synaptic block 112 (e.g., corresponding the axon block of the neuron circuit 810 as will be described later below), and each post-synaptic element 118 may refer or correspond to a post-synaptic spike from the neurosynaptic processing core 100, which may be represented by a neuron (e.g., corresponding to the neuron block of the neuron circuit 810 as will be described later below). Accordingly, for example, the pre-synaptic element 116 may be or correspond to a copy input spike to the neurosynaptic processing core 100 and the post-synaptic element 118 may be or correspond to a copy output spike from the neurosynaptic processing core 100. For example, a neuron output (an output spike or a post-synaptic spike from a post-synaptic element 118 (which may be referred to as a neuron or neuron element) may be routed in a neuromorphic mesh (or network) from one neuromorphic processing core to another neuromorphic processing core and terminates at a pre-synaptic element of a pre-synaptic block of a spiking neuron block (e.g., an axon (or axon element) of an axon block of a neuron circuit) of that another neuromorphic processing core as a spike (a pre-synaptic spike) arriving thereat.

Accordingly, components or blocks of the inference network have been described above. Various components or blocks of the error modulated STDP learning method according to various example embodiments will now be described below.

Spike Trace: A spike trace tr(t) may be a low pass filtered form of spike s(t). Various example embodiments may implement the low pass filtering mechanism based on a first order RC (exponentially decaying) filter. In this regard, the time constant of the filter may determine how far apart in time the pre-synaptic spike, $s_{pre}(t)$, and post-synaptic spike, $s_{post}(t)$, can interact with each other for learning. $tr_{pre}$ and $tr_{post}$ denote pre-synaptic trace and post-synaptic trace, respectively.

Error: An error may be any form of supervised learning error given a target statistics. By way of an example only and without limitation, a target statistics, $\hat{y}$, may be simply a desired spike count of the output over an interval $t \in [0,T]$. Then $y=h(s_{out}(t))$ is the actual spike count in the interval $[0,T]$ and the error may thus be determined as shown in Equation 1 below:

$$error = (y - \hat{y}). \tag{1}$$

In various example embodiments, the learning method may minimize the loss $$\frac{1}{2}(y - \hat{y})^2.$$

Learning: The error modulated STDP learning method (or learning rule) according to various example embodiments may be expressed as shown in Equation (2) below:

$$\Delta\omega_{post,pre} = -\text{error}(t)\times(A_+tr_{pre}(t)s_{post}(t)-A_-s_{pre}(t)tr_{post}(t)) \quad (2)$$

In Equation 2, $A_+$ and $A_-$ are the STDP learning constants. According to various example embodiment, the weight may be updated at every time step. The error, however, may not be available at every time step, for example, if the spike count statistics error $y-\hat{y}$ is used, then the error may only be calculated at an interval of T time units. In such a case, the error modulated STDP learning method may be expressed as shown in Equation 3 below:

$$\Delta w_{post,pre} = (\hat{y} - y) \times \int_0^T (A_+tr_{pre}(t)s_{post}(t) - A_-s_{pre}(t)tr_{post}(t))dt \quad (3)$$

and the weight may be updated in an interval of T time units.

Figure 7:
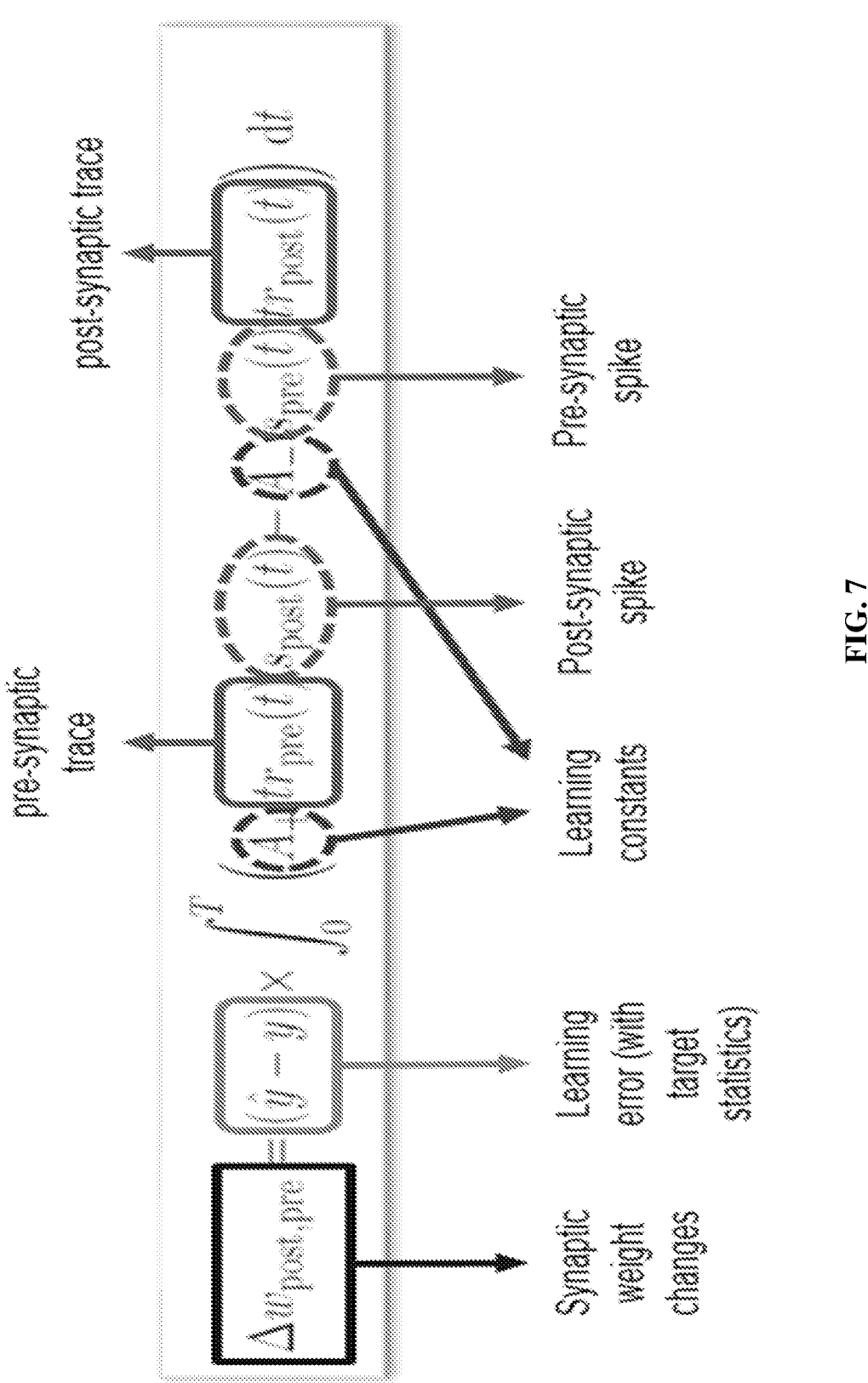
FIG. 7 depicts an annotated equation relating to an error modulated STDP learning method, according to various example embodiments of the present invention.
Figure 8:
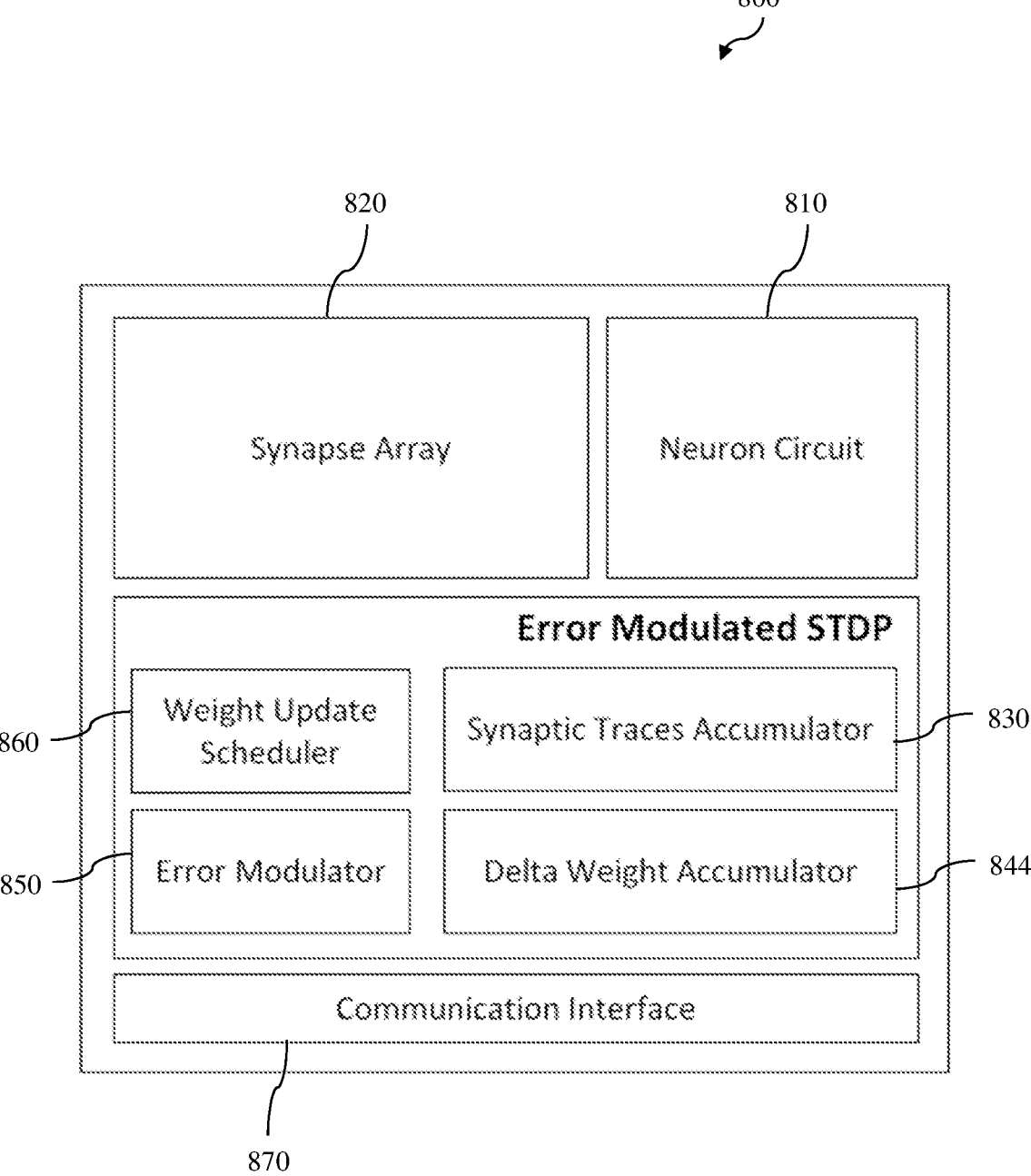
FIG. 8 depicts an overview architecture design of a learning neurosynaptic core (e.g., corresponding to the neurosynaptic processing core as described with reference to FIG. 1) with various computational blocks, according to various example embodiments of the present invention.

For illustration purpose only and without limitation, FIG. 7 annotates Equation 3 with various labels according to various example embodiments to facilitate better understanding. It will be understood by a person skilled in the art the learning method is not limited to the above-described expressions (or forms) (Equations 2 and 3), which are provided by way of examples only and without limitations, and various modifications or variations to the learning method is possible and are within the scope of the present invention. By way of an example only and without limitation, the following expression (or form) may eliminate the need for complex multiplication units in hardware, and yet is effective.

$$\Delta w_{post,pre} = \left[\text{sign}(\hat{y} - y) \times \int_0^T (A_+tr_{pre}(t)s_{post}(t) - A_-s_{pre}(t)tr_{post}(t))dt\right]_{Q\in\{1,0,1\}} \quad (4)$$

In Equation 4, Q represents quantization operation on the value inside the square brackets, and $Q\in\{-1, 0, 1\}$ indicates an example of ternary quantization.

Architecture Design: Neurosynaptic Core with On-Chip Learning

Various example embodiments provide an architecture design of a neurosynaptic core that serves as a key building block of a modular neuromorphic SNN with on-chip learning capability. The architecture design disclosed is also a key enabler for the neuromorphic SNN to achieve the network learning outcome with a very low number of learning neurosynaptic cores (e.g., as low as one to a few). In this regard, the learning neurosynaptic core(s) may be mapped as the last layer of the network.

An overview architecture design of a learning neurosynaptic core 800 (e.g., corresponding to the neurosynaptic processing core 100 as described hereinbefore according to various embodiments) with various computational blocks according to various example embodiments is shown in FIG.

8. The learning neurosynaptic core 800 comprises a plurality of building blocks, including a neuron circuit 810 (e.g., corresponding to the spiking neuron block 110 as described hereinbefore according to various embodiments), a synapse array 820 (e.g., corresponding to the synapse block 120 as described hereinbefore according to various embodiments), a synaptic trace accumulator 830 (e.g., corresponding to the pre-synaptic event accumulator 132 and the post-synaptic event accumulator 134 as described hereinbefore according to various embodiments), a delta weight accumulator 844 (e.g., corresponding to the weight change accumulator 144) as described hereinbefore according to various embodiments), an error modulator 850 (e.g., corresponding to the learning error modulator 150 as described hereinbefore according to various embodiments), a weight update scheduler 860 (e.g., corresponding to the synaptic weight modifier 160 as described hereinbefore according to various embodiments) and a communication interface 870. The learning capability in the learning neurosynaptic core 800 is provided based on the synaptic trace accumulator 830, the delta weight accumulator 844, the error modulator 850 and a weight update scheduler 860, which may herein be referred to as the learning blocks. The learning blocks formulate the error modulated STDP method (or STDP rule) to learn the new synaptic weights in the learning neurosynaptic core 800. By monitoring the synaptic activities inside the neuron circuit 810 throughout the network learning period, the learning blocks may compute the synapse weight changes and the synapse weight changes may then be imposed on the synapse array 820. The communication interface 870 may be configured to enable time-multiplexed communication between various neurosynaptic cores in the network and also to the external processor (e.g., corresponding to the processor 404 as described hereinbefore according to various embodiments).

Figure 9:
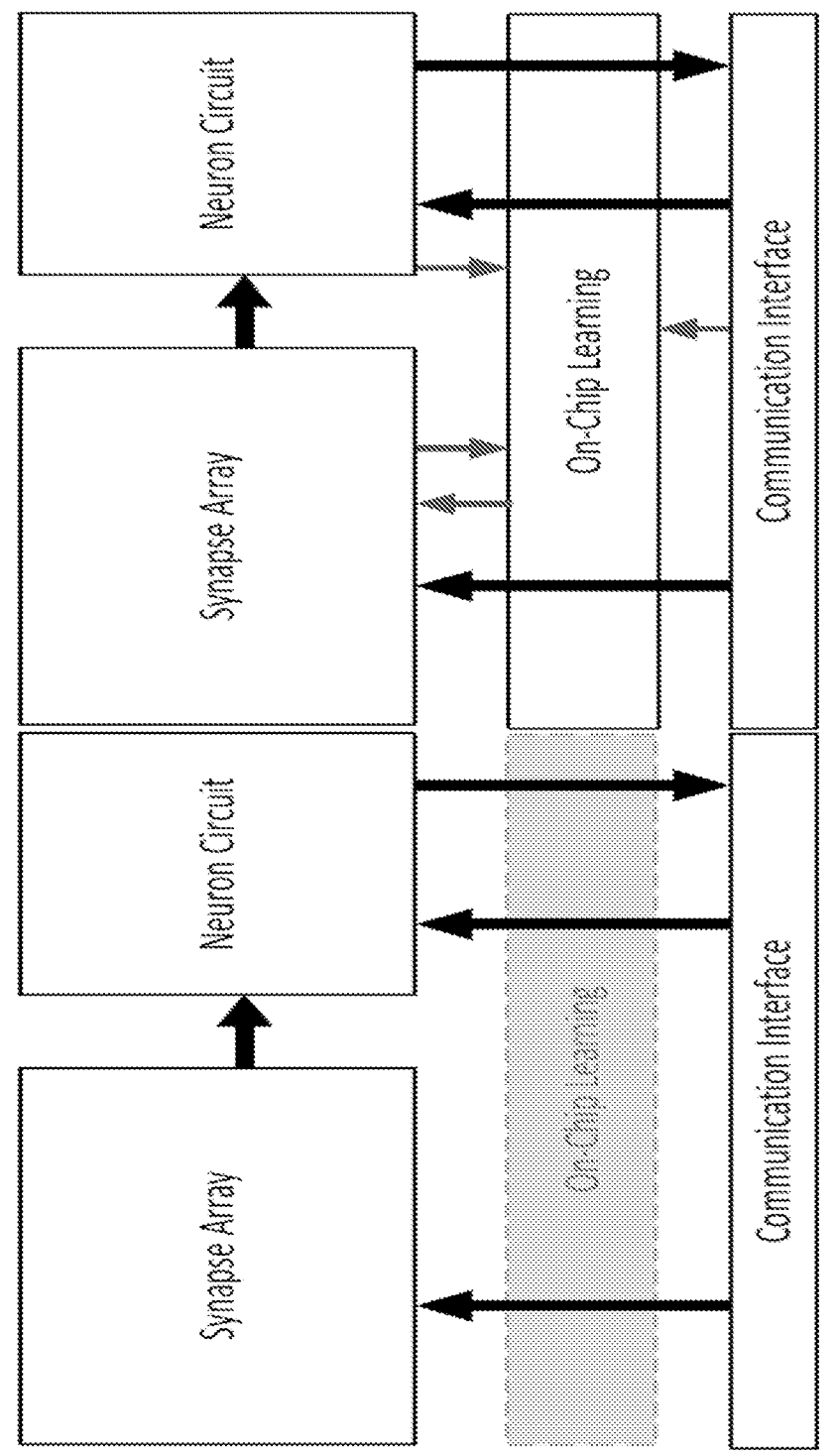
FIG. 9 depicts a schematic drawing of an operational flow for duo on-chip operational modes for the learning neurosynaptic core, including an inference mode (left side) and a learning mode (right side), according to various example embodiments of the present invention.

Accordingly, the architecture design for the learning neurosynaptic core 800 according to various example embodiments is highly adaptable in the system-level integration. For example, the architecture design is feasible for SNN system with homogeneous and heterogeneous network configurations. The architecture design may also support two operations, namely, inference (without learning) mode and learning mode. For illustration purpose only, the operational flow for both on-chip modes and the involvement of the computational blocks is shown in FIG. 9. In particular, FIG. 9 depicts a schematic drawing of the operational flow for the duo on-chip operational modes for the learning neurosynaptic core 800, including an inference mode (left side of FIG. 9) and a learning mode (right side of FIG. 9). Accordingly, the architecture design provides the flexibility to configure the numbers of learning neurons involved in every network learning process, from a low as a single neuron to all of the neurons in the learning neurosynaptic core 800.

Neuron Circuit and Synapse Array

Figure 10:
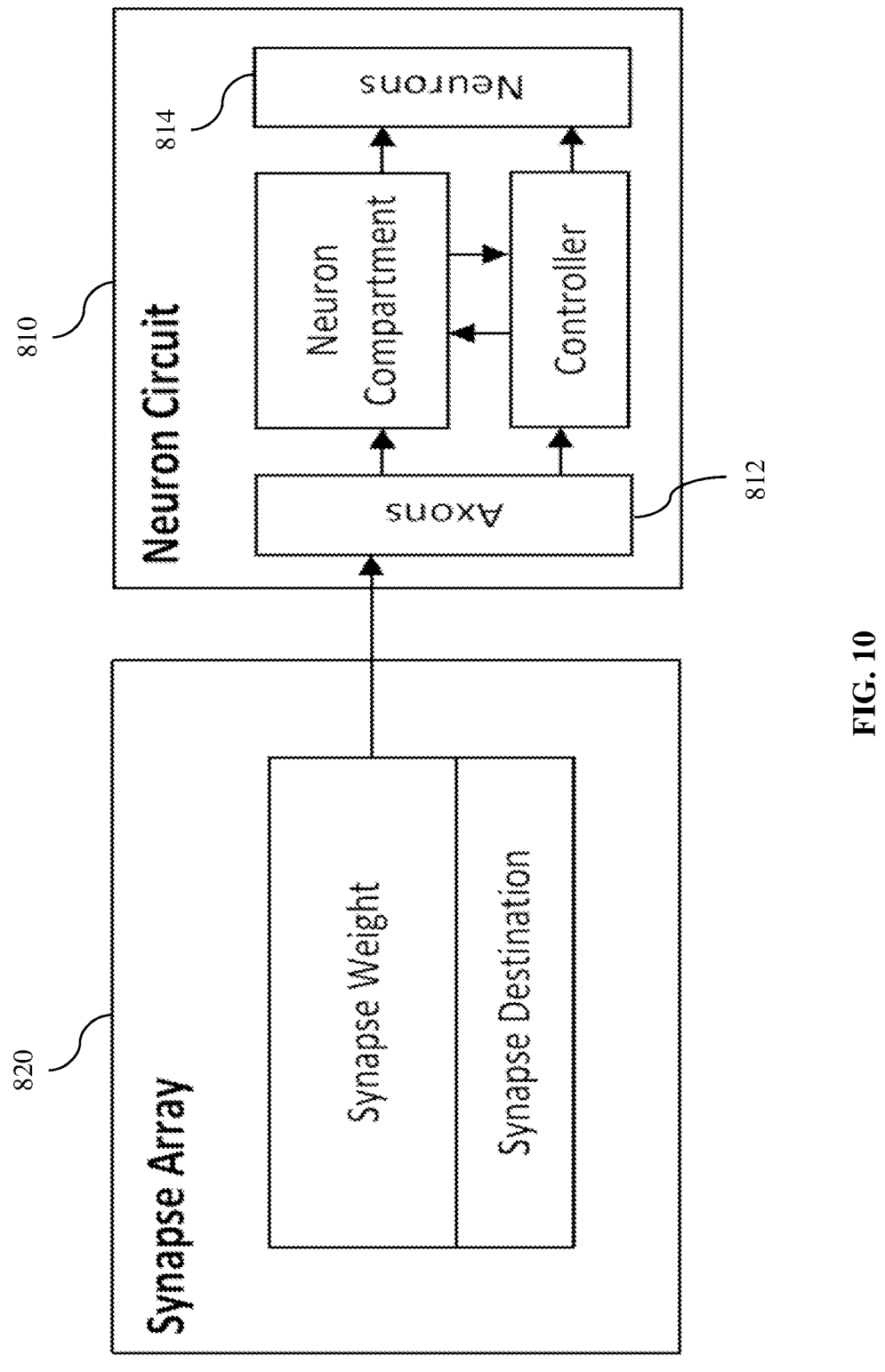
FIG. 10 depicts a schematic drawing of a neuron circuit block and a synapse array block, illustrating their architecture design, of the learning neurosynaptic core, according to various example embodiments of the present invention.

Both the neuron circuit block 810 and the synapse array block 820 may be configured to mimic key aspects of the biological neurons and synapses behaviors in the learning neurosynaptic core 800. FIG. 10 depicts a schematic drawing of the neuron circuit block 810 and the synapse array block 820, illustrating their architecture design, of the learning neurosynaptic core 800 according to various example embodiments of the present invention. The neuron circuit block 810 and the synapse array block 820 will now be described in further detail below according to various example embodiments of the present invention.

The neuron circuit block 810 may comprise a circuitry with its core computation in the neuron compartment that provides the integrate-and-fire (I&F) dynamic functionality for the neurons. Typical choices are the spiking neuron models with leak mechanism, such as adaptive exponential I&F model and leaky I&F (LIF) model. The neuron circuit block 810 may further include driver mechanism in the controller that controls the inputs and outputs which may be implemented as axons of an axon block 812 (e.g., corresponding to the plurality of pre-synaptic elements 116 of the pre-synaptic block 112 as described hereinbefore according to various embodiments) and neurons of a neuron block 814 (e.g., corresponding to the plurality of post-synaptic elements 118 of the post-synaptic block 114 as described hereinbefore according to various embodiments). The learning eligibility may be extended to k numbers of neurons and may herein be referred to as learning-activated-neurons.

The synapse array block 820 may comprise a crossbar array emulated with electronic synapses at each cross-point. Each synapse may include (or has associated therewith) two parameters, the weight and address (in the crossbar array) which may be represented as synapse weight (e.g., corresponding to the synaptic weight parameter as described hereinbefore according to various embodiments) and synapse destination. According to various example embodiments, the crossbar array may be implemented using a (j×i)×m crossbar memory, where j×i is the density of the learning neurosynaptic core 800, and m is the resolution of the synapses' weights, such as in number of bits.

Synaptic Trace Accumulator

Figure 11:
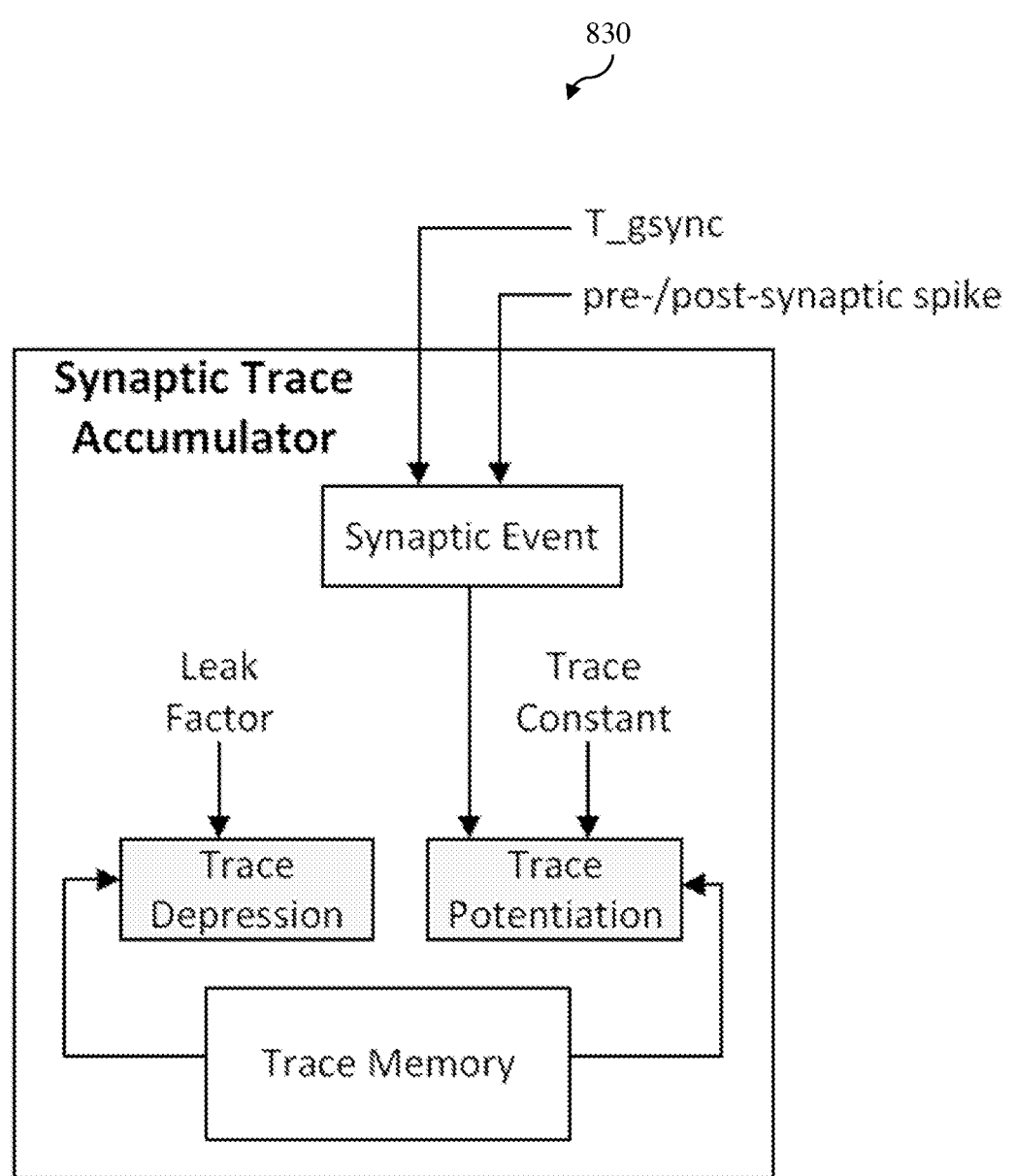
FIG. 11 depicts a schematic drawing of a synaptic trace accumulator of the learning neurosynaptic core, according to various example embodiments of the present invention.

The synaptic trace accumulator 830 may be configured to record the activities of active synapses in both the input (pre-synaptic) and output (post-synaptic) connections of the neuron circuit 810 on every global time step ($T_{gsync}$). In various example embodiments, $T_{gsync}$ may refer to the time window when the sequence of the synaptic activities have valid potentiation or depression effects. In various example embodiments, the synaptic activities may be recorded in the form of spike traces throughout the network learning process. FIG. 11 depicts a schematic drawing of the synaptic trace accumulator 830 according to various example embodiments of the present invention. The synaptic trace accumulator 830 for pre-synaptic activities (e.g., corresponding to the pre-synaptic event accumulator 132 as described hereinbefore according to various embodiments) and for post-synaptic activities (e.g., corresponding to the post-synaptic event accumulator 138 as described hereinbefore according to various embodiments) may be the same, except that an input thereto are based on pre-synaptic activities and post-synaptic activities, respectively. The synaptic trace accumulator 830 will now be described in further detail below according to various example embodiments of the present invention.

A trace memory (e.g., corresponding to the pre-synaptic spike event memory block 134 or the post-synaptic spike event memory block 140 as described hereinbefore according to various embodiments) may be provided and configured as a memory unit storage (such as flip flops or register files) used to record synaptic activities and maintain the spike traces throughout the network learning process. In various example embodiments, two independent units are provided for pre- and post-synaptic activities and are termed as pre-traces and post-traces, respectively. In various example embodiments, an allocation of i traces may be provided for all i synapses at the input connection and an allocation of j traces may be provided for all j synapses at the output connection in the neuron circuit 810.

A trace potentiation (e.g., corresponding to the pre-synaptic spike parameter incrementor or the post-synaptic spike parameter incrementor as described hereinbefore according to various embodiments) may be provided and configured as a control unit that increments the traces by a trace constant value upon every pre- or post-synaptic activity in every time step $T_{gsync}$. The trace constant may be a non-zero positive integer with the magnitude less than the resolution of the traces. The value may be programmed by an external processor upon system initialization or hard-coded during implementation. The value may differ for different learning applications.

A trace depression (e.g., corresponding to the pre-synaptic spike parameter decrementor or the post-synaptic spike parameter decrementor as described hereinbefore according to various embodiments) may be provided. In various example embodiments, pre- and post-traces may persist until trace potentiation is enabled and subsequently the magnitude may be decremented by a leak factor. This reduction mechanism may be implemented with the same characteristic (e.g., activation time and leak amount) as the leak mechanism in the neuron circuit 810. In various example embodiments, the leak factor may be programmed by an external processor upon system initialization or hard-coded during implementation.

In various example embodiments, the generated pre- and post-synaptic traces may preferably fulfill the following criteria.

Record the synaptic activities in a given time period without interfering the neuron circuit 810 and the synapse array 820 computational activities.

Both traces are independent units and they may be operated concurrently or sequentially.

The magnitude increments/potentiates upon every active synaptic activity within the $T_{gsync}$ and persist for a duration of time before it decrements/depresses subsequently.

The magnitude may need to be maintained within a given range, depending on the resolution bits.

The chosen resolution may affect the accuracy of the network learning process and also may impact directly on the hardware resource consumption and performance.

Delta Weight Accumulator

Figure 12:
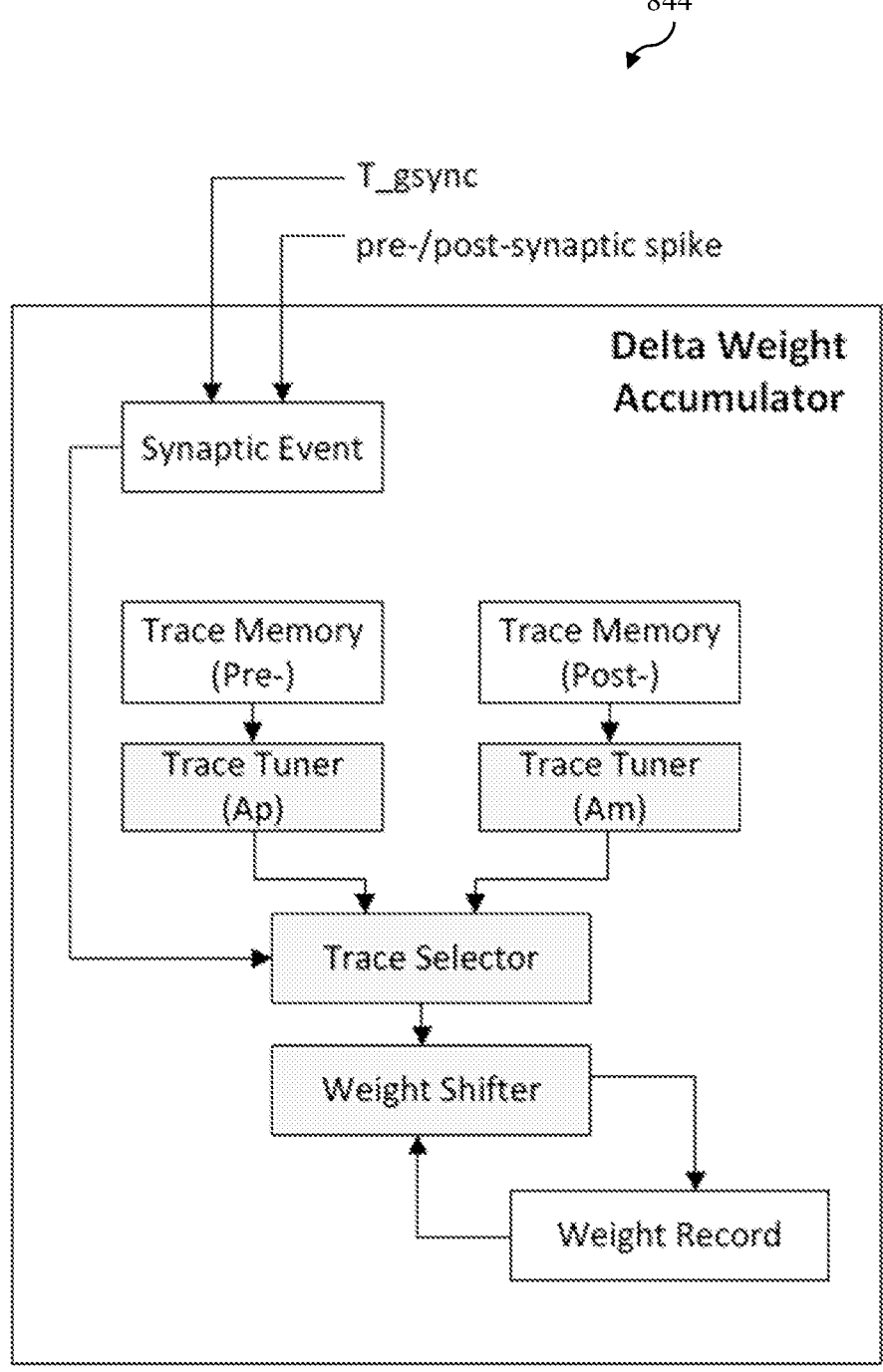
FIG. 12 depicts a schematic drawing of a delta weight accumulator of the learning neurosynaptic core, according to various example embodiments of the present invention.

Apart from the spike traces (that records the synaptic spikes activities), the synaptic weight changes may also be dependent on the sequence the synaptic spikes activities. According to the STDP method according to various example embodiments, the synaptic weight is potentiated in the event of pre-synaptic spike arrival preceding the post-synaptic spike in a valid time window ($T_{gsync}$). If the temporal order is reversed, the synaptic weight is depressed. In this regard, a delta weight accumulator 844 may be provided and configured to compute and to store the weight change accumulation (synaptic weights' potentiation and depression) throughout the network learning process. FIG. 12 depicts a schematic drawing of the delta weight accumulator 844 according to various example embodiments of the present invention. In particular. FIG. 12 depicts the delta weight accumulator 844 being updated according to the synaptic activities' record (traces).

A trace selector (e.g., corresponding to the synaptic spike event selector as described hereinbefore according to various embodiments) may be provided and configured as a control unit that is activated upon the event of the pre- and post-synaptic spike to select pre- and post-traces, respectively.

A trace tuner (Ap/Am) may be provided and configured to fine-tune pre- and post-traces values by $A_p$ and $A_m$ parameters, respectively (e.g., corresponding to the $A_+$ and $A_-$ parameters, respectively, in the above-mentioned Equations (2) to (4)). The tuning rate, $A_p$ and $A_m$, may be programmed by an external processor upon system initialization or hard-coded during implementation. The value may differ for different learning applications. By way of an example only and without limitation, a possible choice of $A_p$ and $A_m$ are integers with their binary logarithm are also integer values.

A weight shifter (e.g., corresponding to the weight change parameter modifier as described hereinbefore according to various embodiments) may be provided and configured as an adjustment unit that updates the record of weight change accumulation throughout the network learning process. The adjustment for potentiation or depression may be driven by the trace selector.

A weight record block (e.g., corresponding to the weight change memory block as described hereinbefore according to various embodiments) may be provided and configured as a memory storage for storing the weight change accumulation with the capacity of $(j \times i) \times l$ bits with $(j \times i)$ corresponds to the density of the neurosynaptic core and $l \geq m$ with m is the resolution of the synapses' weights.

In various example embodiments, the generated weight change accumulation may preferably fulfill the following criteria.

Updates within the time step ($T_{gsync}$) and in the event of synaptic spikes until the end of the network learning process.

Increments in the event of the post-synaptic spike by the value from the trace selector. Decrements in the event of the pre-synaptic spike by the value from the trace selector.

The magnitude may need to be maintained within a given range, depending on its resolution bits.

The resolution may affect the accuracy of the network learning process and may also impact directly on the hardware resource consumption and performance.

The adjustment rate may be subjected to the parameters assigned in the trace tuner (Ap/Am).

Error Modulator

Figure 13:
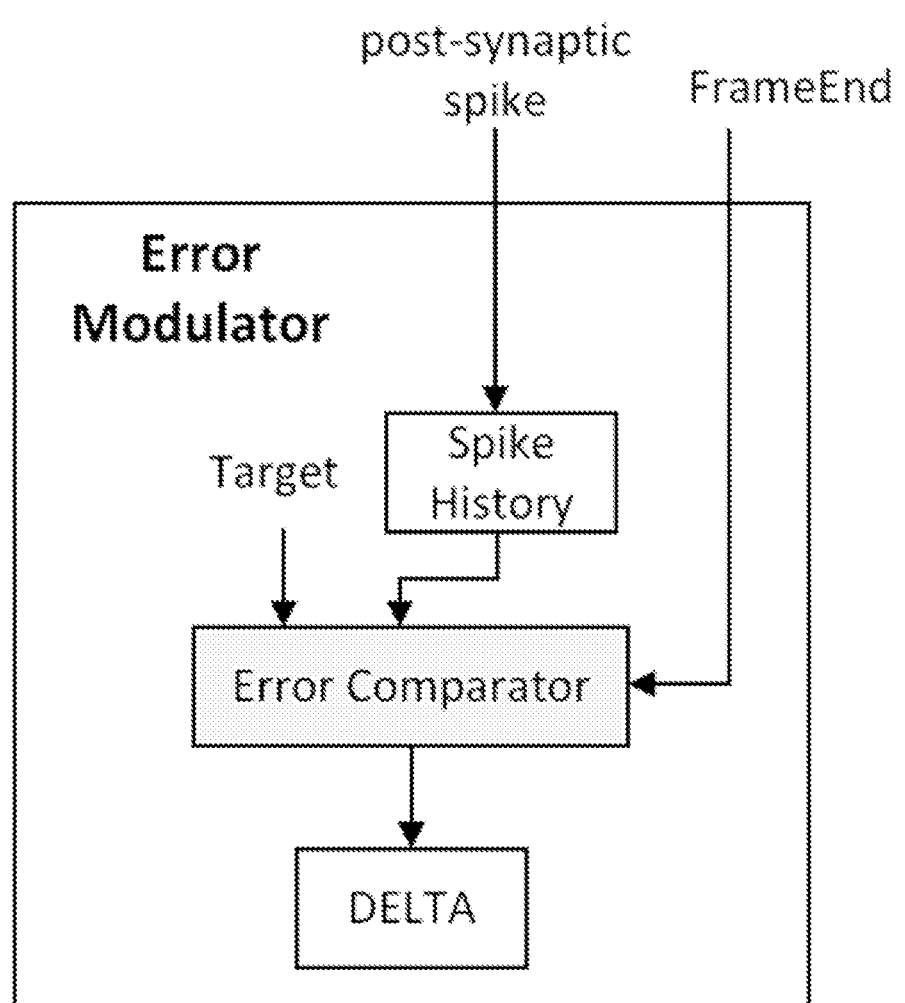
FIG. 13 depicts a schematic drawing of an error modulator of the learning neurosynaptic core for supervised learning error with STDP, according to various example embodiments of the present invention.

FIG. 13 depicts a schematic drawing of the error modulator 850 for supervised learning error with STDP according to various example embodiments of the present invention. The error modulator 850 may be responsible to provide the supervised learning error that is needed to modulate the STDP learning process. The function is as depicted in FIG. 13. The error modulator 850 will now be described in further detail below according to various example embodiments of the present invention.

A spike history block (e.g., corresponding to the synaptic spike event record block as described hereinbefore according to various embodiments) may be provided and configure as a k-record unit that keeps an account of the total post-synaptic spikes for all the k learning-activated-neurons throughout the network learning process.

An error comparator (e.g., corresponding to the learning error determiner as described hereinbefore according to various embodiments) may be provided and configured as a computational unit that evaluates the learning-activated-neurons' spiking record based on the statistic in a target (e.g., corresponding to the reference parameter as described hereinbefore according to various embodiments). The evaluation may be activated at any point throughout the network learning process, which is indicated as FrameEnd (e.g., corresponding to the second trigger signal as described hereinbefore according to various embodiments) in this description. Target may be a form of statistical references that indicates the learning outcome of either being true class or false class. The references may be programmed by an external processor upon system initialization or sent internally using controller circuit. The value may differ for different learning applications.

A delta block (e.g., corresponding to the learning error evaluator as described hereinbefore according to various embodiments) may be provided and configured to generate a generalized learning outcome for the synaptic weight changes based on the learning error determined by the error comparator.

In various example embodiments, the delta block may preferably fulfills the following criteria.

Generates upon activation and may be generated a single time or several times throughout the network learning process.

Generates a generalized learning outcome that may indicate one of the three possible actions: synaptic weight depression, maintain or potentiation.

The outcome may consider all of the possible scenario combinations from both the spike history block and the target.

Although the error modulator 850 for supervised learning error with STDP based on a spike history block has been described above according to various example embodiments, the present invention is not limited to such a specific learning error technique and other learning error techniques may be implemented or employed as desired or as appropriate without deviating from the scope of the present invention, as long as an error modulated STDP learning is provided, that is, the STDP learning is error modulated, such as but not limited to, based on a difference of instantaneous firing rate of the output and desired rate, a spike train distance/similarity metric between target and desired spike train, a probability estimate of output based on total spike count, and so on.

Weight Update Scheduler

Figure 14:
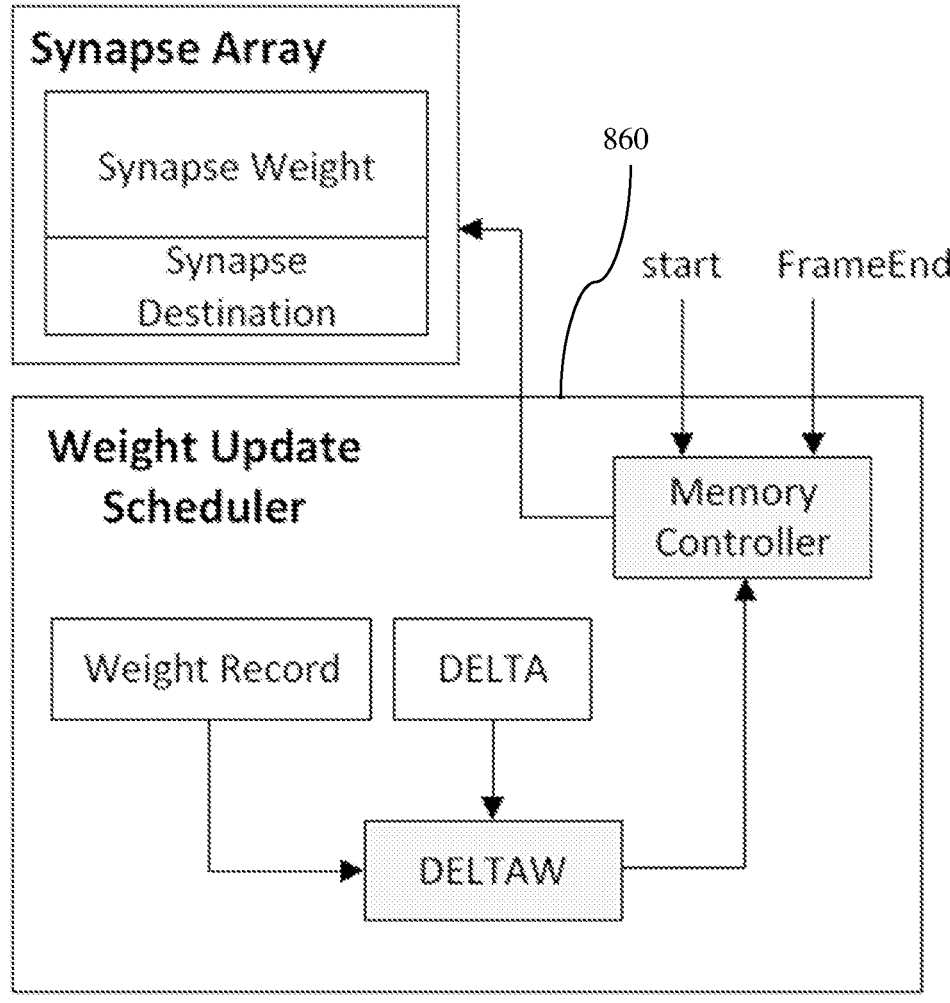
FIG. 14 depicts a schematic drawing of a weight update scheduler for synaptic weights' changes, according to various example embodiments of the present invention.

FIG. 14 depicts a schematic drawing of the weight update scheduler 860 for synaptic weights' changes according to various example embodiments of the present invention. In various example embodiments, the synaptic weight actual change may be finalized based on the delta block and the weight record block. The deduced synaptic weight changes may then lead to the value modification in the synapse weight in the learning neurosynaptic core 800. The weight update scheduler 860 will now be described in further detail below according to various example embodiments of the present invention.

A memory controller may be provided and configured as a controller unit that can be activated by the enablers such as FrameEnd or start signals. It can also be activated a single time or several times throughout the network learning process. The controller may have direct or indirect access to the synapse array block 820. For example, the memory controller may be configured to be capable of performing READ, UPDATE and WRITE operations over the synapse weight that corresponds to the assigned synapse destination. For example, the READ/WRITE operations may be performed by direct memory access or by Finite State Machine (FSM) or by internal/external device programmer with dedicated interface.

A DELTAW block (e.g., corresponding to the weight change determiner as described hereinbefore according to various embodiments) may be provided and configured as a computational unit that calculates the actual or desired weight changes in the above-mentioned UPDATE operation. In various embodiments, the decision (or determination) is based on the relationship of the generalized learning outcome from the DELTA block and the weight change accumulation from the weight record. The relationship can be conditioned to suit the network's performance and accuracy requirement.

Operation and Timing Flow

By way of an example for illustration purpose only and without limitation, an operation and a timing flow of the learning neurosynaptic core in SNN will now be further described according to various example embodiments using a configuration scenario as an example. The given configuration incorporated the communication between the neuromorphic systems with an external processor. An external processor (e.g., corresponding to the processor 404 as described hereinbefore according to various embodiments) may be configured or responsible for sending the spikes inputs, control signals and configuration settings to the neuromorphic system and may be routed internally to the learning neurosynaptic core. These inputs, signals and settings to the learning neurosynaptic core 800 will now be described below according to various example embodiments of the present invention.

Spikes: Main inputs to the learning neurosynaptic core 800 and are encoded in the form of spikes.

$T_{gsync}$ (e.g., corresponding to the first time step as described hereinbefore according to various embodiments): An indicator of the time window when the sequence of the synaptic activities have valid potentiation or depression effects. It may be used to synchronize the learning pace of the synaptic trace accumulator and the delta weight accumulator.

FrameEnd (e.g., corresponding to the second trigger signal as described hereinbefore according to various embodiments): An activation signal to the error comparator and the memory controller. It may be sent at any time during the learning operation.

start: A signal (e.g., a third trigger signal) to activate the memory controller. It can be sent at any time during the inference operation or learning operation.

Target: Statistical references for the error comparator.

Trace Constant: Incremental factor for the trace potentiation.

Leak Factor. Decremental factor for component Trace Depression.

Ap/Am. Tuning rate for components Trace Tuner (Ap) and Trace Tuner (Am).

Figure 15:
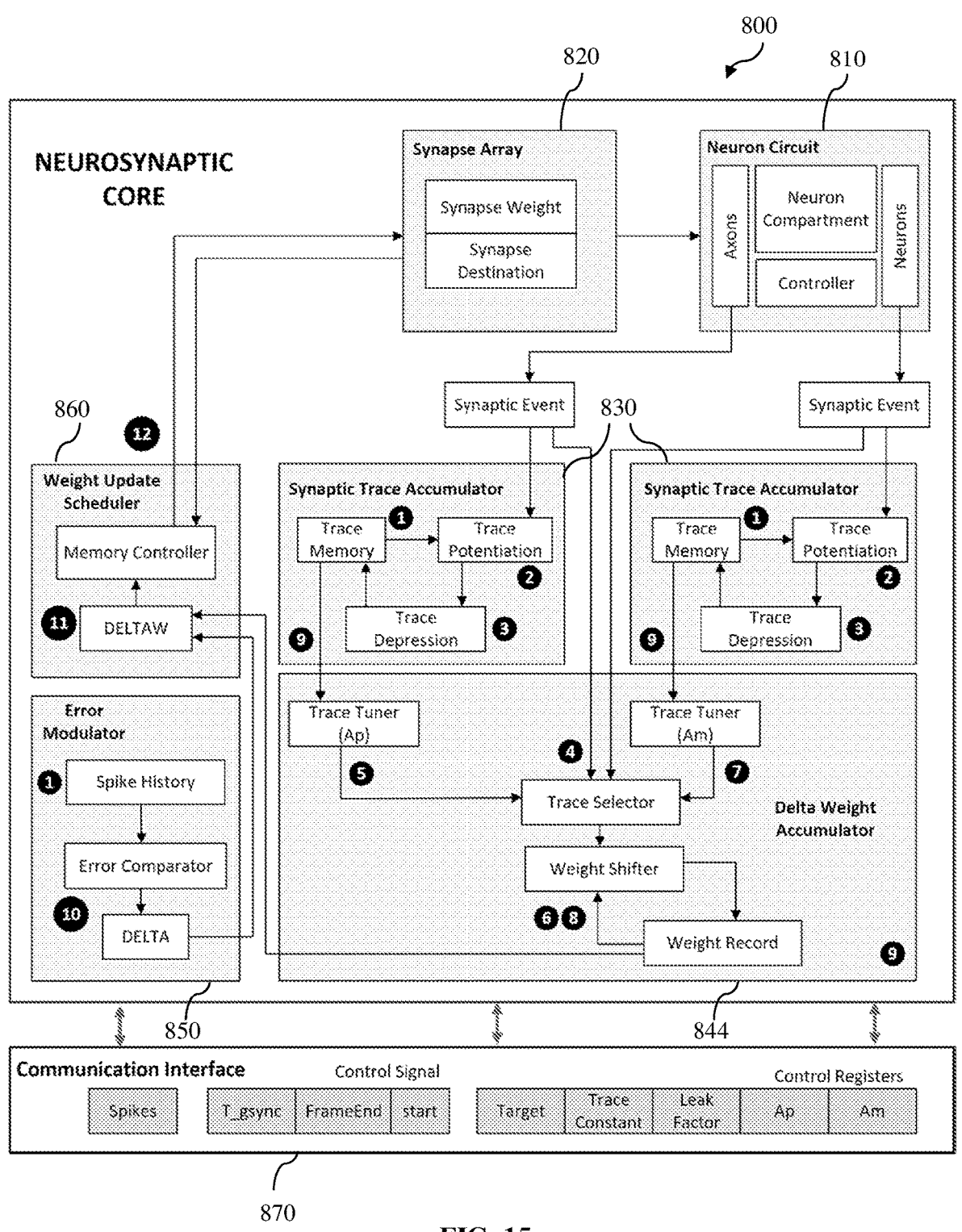
FIG. 15 depicts a schematic diagram illustrating an overview of an operation and timing flow for on-chip learning in the learning neurosynaptic core, according to various example embodiments of the present invention.

In various example embodiments, the learning mechanism for the entire SNN system may mainly be handled by the learning neurosynaptic core 800 and the operation and timing flow are provided below with reference to FIG. 15, by way of an example for illustration purpose only and without limitation. In particular, FIG. 15 depicts a schematic diagram illustrating an overview of an operation and timing flow for on-chip learning in the learning neurosynaptic core 800.

Step 1: In every $T_{gsync}$ time step, the events of input (pre-synaptic) spikes and output (post-synaptic) spikes (e.g., corresponding to the first pre-synaptic spike event input or the first post-synaptic spike event input, respectively, as described hereinbefore according to various embodiments) may drive the synaptic trace accumulator 830. In other words, the trace memory for both pre- and post-synaptic spikes may be updated independently. At the same time, the spike history block in the error modulator 850 may record the number of post-synaptic spikes from all the learning activated-neurons.

Step 2: In the event of synaptic spike (within $T_{gsync}$), the trace memory may be updated based on the trace potentiation block and the trace depression block.

Step 3: If no synaptic spike (within $T_{gsync}$), the trace memory may be updated based on the trace depression block.

Step 4: In every $T_{gsync}$ time step, the event of synaptic spikes may also drive the delta weight accumulator 844 and at the completion of the synaptic trace accumulator 830. It will be appreciated by a person skilled in the art that, for example, steps 1-3 may be executed sequentially or concurrently.

Step 5: The event of the post-synaptic spike (within $T_{gsync}$) (e.g., corresponding to the second post-synaptic spike event input as described hereinbefore according to various embodiments) may enable the trace selector and the trace selector may retrieve the fine-tuned pre-trace values from the trace tuner (Ap).

Step 6: Following from Step 5, the weight change accumulation values in the weight record block may be adjusted by the weight shifter.

Step 7: the event of the pre-synaptic spike (within $T_{gsync}$) (e.g., corresponding to the second pre-synaptic spike event input as described hereinbefore according to various embodiments) may enable the trace selector and the trace selector may retrieve the fine-tuned post-trace values from the Trace Tuner (Am).

Step 8: Following from Step 7, the weight change accumulation values in the weight record may be adjusted by the weight shifter.

Step 9: Steps 5-6 and Steps 7-8 may be executed in the reverse order and in consecutive manner.

Figure 16:
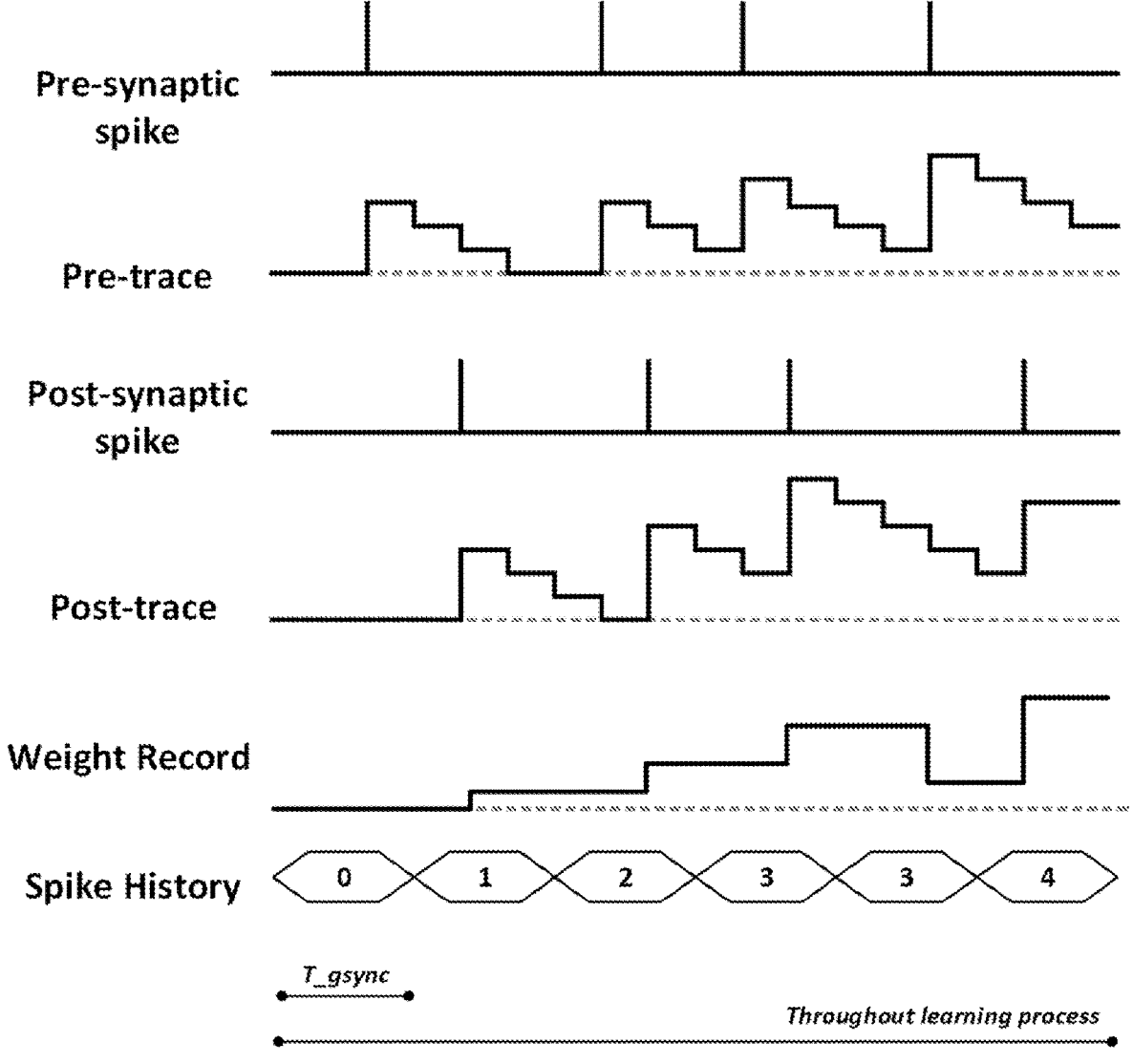
FIG. 16 depicts an internal activity graph in the synaptic trace accumulator and the delta weight accumulator, according to various example embodiments of the present invention.

In various example embodiments, Steps 1-8 may be executed in every $T_{gsync}$ time step. Both the synaptic trace accumulator and the delta weight accumulator may remain active until the end of the learning process and an example overview of their internal activities is as illustrated in FIG. 16. In particular, FIG. 16 depicts an internal activity graph in the synaptic trace accumulator and the delta weight accumulator, according to various example embodiments of the present invention. By way of an example only and without limitation, in the event of spike (pre-synaptic or post synaptic), its corresponding trace (pre- or post) may be potentiated with a certain constant and the trace may leak gradually over the time. Within every global time step (Tgsync), the event of post-synaptic spike may contribute to an increment of weight record by the amount of pre-trace at that particular time. Likewise, within every global time (Tgsync), the event of pre-synaptic spike may lead to a decrement of weight record by the amount of the post-trace at that particular time. The spike history may keep a record of the total of post-synaptic spike events over the time.

Step 10: Control signal FrameEnd activates the error comparator that in turn, drives the DELTA block. For every learning-activated-neuron, the recorded value in the spike history block may be evaluated with the corresponding Target value.

Step 11: the DELTAW block may calculate the actual weight changes based on the generalized learning outcome from the DELTA block and the weight change accumulation from the weight record block.

Step 12: the control signals FrameEnd and/or start activates the memory controller. The weight update scheduler 860 may access and update the synapse weights in the synapse array 820.

Accordingly, a neurosynaptic core design with error modulated STDP learning method (or learning rule) and its operational method have been described according to various example embodiments. The neuromorphic SNN system comprising the neurosynaptic core(s) 800 according to various example embodiments have a number of advantages. First, the learning neurosynaptic core 800 is adaptable to SNN operation modes (learning and inference) with homogeneous or heterogeneous network configurations. Second, the learning mechanism works with scalable SNN architectures, such that it requires very few learning neurosynaptic cores to perform effective on-chip learning. Third, the learning neurosynaptic core is flexible with a configurable number of learning neurons and is therefore feasible for various applications. Therefore, the learning neurosynaptic core 800 is a robust and hardware efficient solution for continual learning in SNN as compared to the conventional SNN neuromorphic based on STDP learning method.

Figure 17:
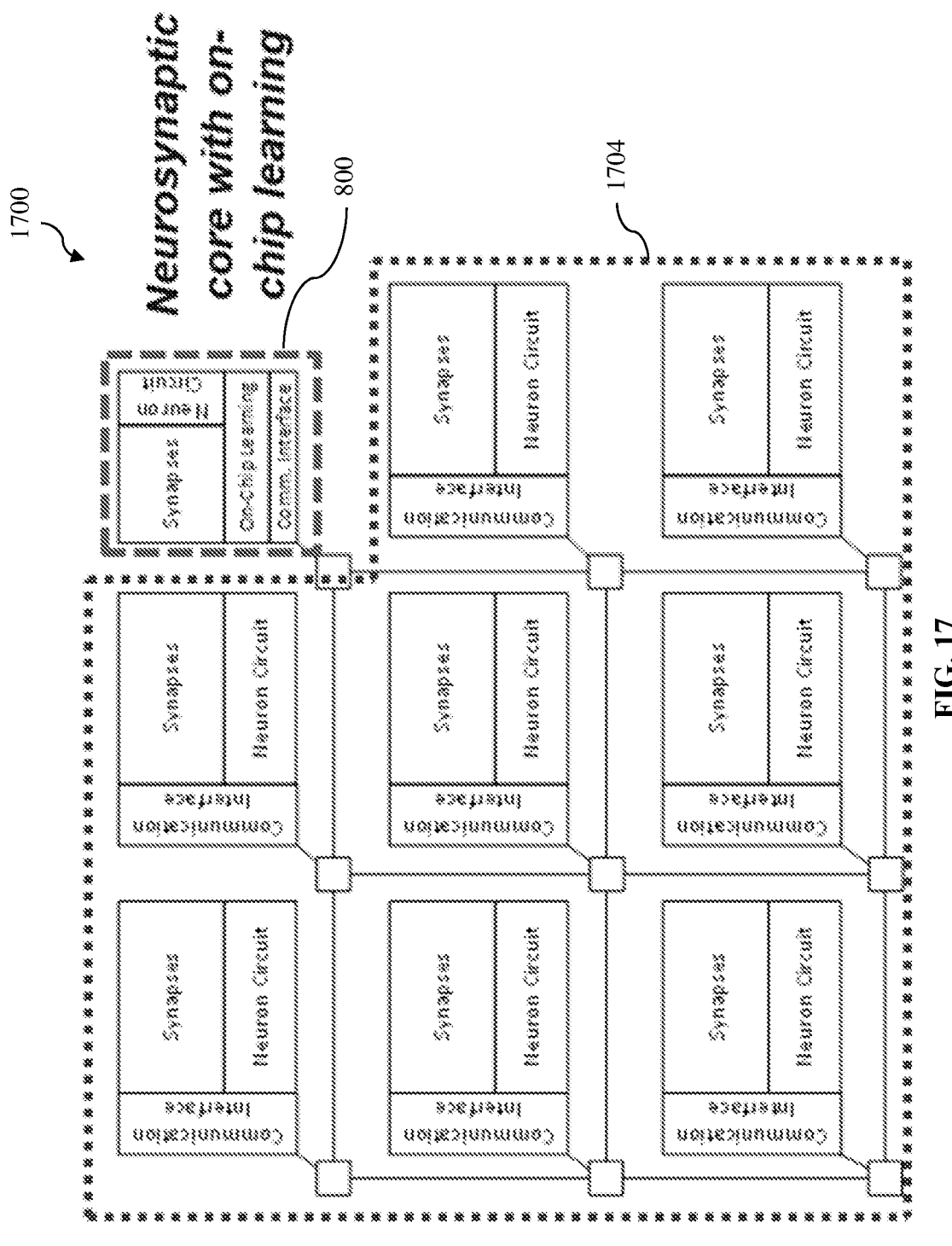
FIG. 17 depicts a schematic drawing of heterogeneous SNN (3×3) neurosynaptic cores with on-chip learning in a single learning neurosynaptic core as the last layer of the SNN, according to various example embodiments of the present invention.
Figure 18:
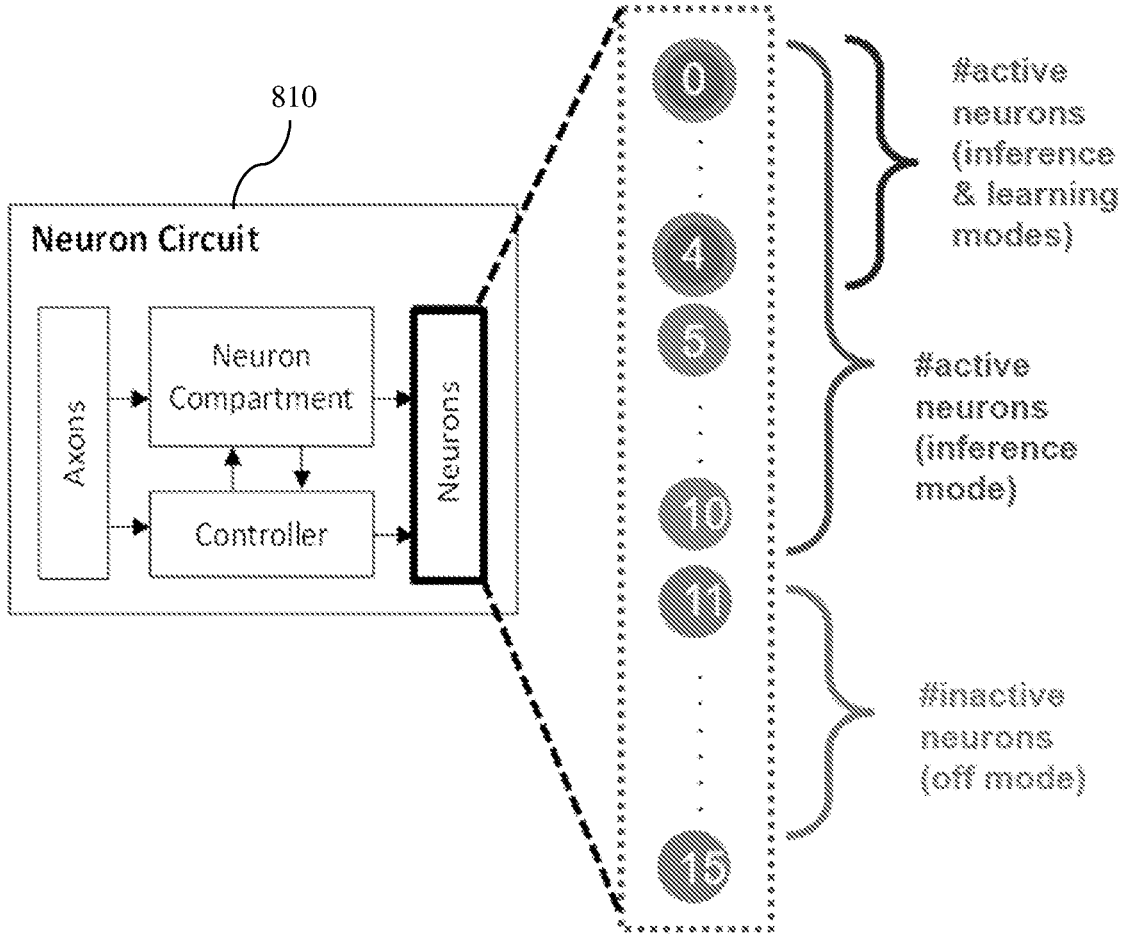
FIG. 18 depicts a schematic drawing of the configurable numbers of the neurons (post-synaptic neurons) in the learning neurosynaptic core, according to various example embodiments of the present invention.

By way of an example for illustration purpose only and without limitation, FIG. 17 depicts a schematic drawing of heterogeneous SNN (3×3) neurosynaptic cores 1700 with on-chip learning in a single learning neurosynaptic core 800 as the last layer of the SNN, according to various example embodiments of the present invention. In the example heterogeneous SNN neurosynaptic core configuration, for example, the non-learning neurosynaptic cores 1704 may each perform inference while the learning neurosynaptic core 800 with on-chip learning may perform both STDP learning and inference. In various example embodiments, the learning neurosynaptic core 800 with on-chip learning may be configured to compute/function in the same or similar manner as the non-learning neurosynaptic cores 1704 but with the additional ability to perform STDP learning/training on-the-fly when needed or desired. Accordingly, as shown, the neurosynaptic core architecture design with error modulated STDP works with scalable neuromorphic SNN system and adaptable with homogeneous and heterogeneous network configurations, as well as supporting configurable numbers of learning neurosynaptic cores in order to accommodate various applications' requirements. In this regard, by way of an example for illustration purpose only and without limitation, FIG. 18 depicts a schematic drawing of the configurable numbers of the neurons (post-synaptic neurons) in the learning neurosynaptic core 800, and in particular, the neuron circuit 810 of the learning neurosynaptic core 800. In FIG. 18, according to various example embodiments, the axons (or axon block) correspond to the pre-synaptic block 112 which correspond to output spikes from neurons of one or more previous neurosynaptic cores (e.g., may be learning and/or non-learning neurosynaptic cores). For example, the axons may be perceived as or correspond to an input to the learning neurosynaptic core 800 or the neuron circuit 810. Meanwhile, the neurons (or neuron block) correspond to the post-synaptic block 114 and may be perceived as or correspond to an output function of the learning neurosynaptic core 800, where in the example shown in FIG. 18, the number of neurons may be configured to suit or accommodate various applications as appropriate or as desired. By way of an example only and without limitation, for MNIST handwritten digit (e.g., including 10 labels), a total of 10 neurons (out of 16 neurons) may be activated.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A neurosynaptic processing core with spike time dependent plasticity (STDP) learning for a spiking neural network, the neurosynaptic processing core comprising:

a spiking neuron block comprising a pre-synaptic block and a post-synaptic block, the pre-synaptic block comprising a plurality of pre-synaptic elements and the post-synaptic block comprising a plurality of post-synaptic elements;

a synapse block communicatively coupled to the spiking neuron block, the synapse block comprising a plurality of synaptic weight parameters, each synaptic weight parameter corresponding to a neuron pair comprising a pre-synaptic element of the plurality of pre-synaptic elements and a post-synaptic element of the plurality of post-synaptic elements;

a STDP learning block communicatively coupled to the spiking neuron block and the synapse block, the STDP learning block comprising:

a pre-synaptic event accumulator comprising:

a pre-synaptic spike event memory block comprising a plurality of pre-synaptic spike parameters corresponding to the plurality of pre-synaptic elements, respectively, each pre-synaptic spike parameter indicating a measure of one or more pre-synaptic spike events at the corresponding pre-synaptic element; and a pre-synaptic spike parameter modifier configured to modify a pre-synaptic spike parameter of the plurality of pre-synaptic spike parameters based on a first pre-synaptic spike event input from the pre-synaptic block indicating a pre-synaptic spike event at the corresponding pre-synaptic element;

a post-synaptic event accumulator comprising:

a post-synaptic spike event memory block comprising a plurality of post-synaptic spike parameters corresponding to the plurality of post-synaptic elements, respectively, each post-synaptic spike parameter indicating a measure of one or more post-synaptic spike events at the corresponding post-synaptic element; and a post-synaptic spike parameter modifier configured to modify a post-synaptic spike parameter of the plurality of post-synaptic spike parameters based on a first post-synaptic spike event input from the post-synaptic block indicating a post-synaptic spike event at the corresponding post-synaptic element; and a weight change accumulator comprising:

a weight change memory block comprising a plurality of weight change parameters corresponding to the plurality of synaptic weight parameters, respectively; and a weight change parameter modifier configured to modify a weight change parameter of the plurality of weight change parameters based a pre-synaptic spike parameter of the plurality of pre-synaptic spike parameters corresponding to the weight change parameter or a post-synaptic spike parameter of the plurality of post-synaptic spike parameters corresponding to the weight change parameter;

a learning error modulator configured to determine a plurality of learning errors associated with the STDP learning block for the plurality of synaptic weight parameters, respectively; and a synaptic weight modifier communicatively coupled to the STDP learning block, the learning error modulator and the synapse block, the synaptic weight modifier being configured to modify a synaptic weight parameter of the plurality of synaptic weight parameters based on a weight change parameter of the plurality of weight change parameters corresponding to the synaptic weight parameter and a learning error of the plurality of learning errors corresponding to the synaptic weight parameter;

wherein the neurosynaptic processing core is formed by a plurality of processors.

2. The neurosynaptic processing core according to claim 1, wherein the synapse block comprises a plurality of synapse elements, each synapse element comprising a synaptic weight parameter of the plurality of synaptic weight parameters corresponding thereto and corresponds to the neuron pair corresponding to the synaptic weight parameter.

3. The neurosynaptic processing core according to claim 2, wherein the plurality of synapse elements are configured as a crossbar memory array, each synapse element being arranged at a corresponding cross-point of crossbar memory array.

4. The neurosynaptic processing core according to claim 1, wherein the pre-synaptic spike parameter modifier comprises a pre-synaptic spike parameter incrementor configured to increment the pre-synaptic spike parameter based on the first pre-synaptic spike event input received from the pre-synaptic block, and the post-synaptic spike parameter modifier comprises a post-synaptic spike parameter incrementor configured to increment the post-synaptic spike parameter based on the first post-synaptic spike event input received from the post-synaptic block.

5. The neurosynaptic processing core according to claim 4, wherein the pre-synaptic spike parameter modifier further comprises a pre-synaptic spike parameter decrementor configured to decrement the pre-synaptic spike parameter, and the post-synaptic spike parameter modifier further comprises a post-synaptic spike parameter decrementor configured to decrement the post-synaptic spike parameter.

6. The neurosynaptic processing core according to claim 5, wherein said each pre-synaptic spike parameter indicates a pre-synaptic trace of the one or more pre-synaptic spike events at the corresponding pre-synaptic element, the pre-synaptic spike parameter incrementor is configured to increment the pre-synaptic spike parameter based on a first incremental value, the pre-synaptic spike parameter decrementor is configured to decrement the pre-synaptic spike parameter based on a first decremental value, said each post-synaptic spike parameter indicates a post-synaptic trace of the one or more post-synaptic spike events at the corresponding post-synaptic element, the post-synaptic spike parameter incrementor is configured to increment the post-synaptic spike parameter based on a second incremental value, and the post-synaptic spike parameter decrementor is configured to decrement the post-synaptic spike parameter based on a second decremental value.

7. The neurosynaptic processing core according to claim 4, wherein the weight change accumulator further comprises a synaptic spike event selector configured to select the pre-synaptic spike parameter from the pre-synaptic spike event memory block for output to the weight change parameter modifier based on a second post-synaptic spike event input from the post-synaptic block indicating the post-synaptic spike event at the corresponding post-synaptic element or select the post-synaptic spike parameter from the post-synaptic spike event memory block for output to the weight change parameter modifier based on a second pre-synaptic spike event input from the pre-synaptic block indicating the pre-synaptic spike event at the corresponding post-synaptic element.

8. The neurosynaptic processing core according to claim 7, wherein the weight change parameter modifier is configured to increment the weight change parameter based on the pre-synaptic spike parameter received from the synaptic spike event selector or decrement the weight change parameter based on the post-synaptic spike parameter received from the synaptic spike event selector.

9. The neurosynaptic processing core according to claim 1, wherein the learning error modulator comprises:

a learning error determiner configured to determine the plurality of learning errors for the plurality of synaptic weight parameters, respectively; and a learning error evaluator configured to determine a learning error outcome for the synaptic weight parameter based on a learning error of the plurality of learning errors corresponding to the synaptic weight parameter, and the synaptic weight modifier is configured to modify the synaptic weight parameter of the plurality of synaptic weight parameters based on the weight change parameter received from the weight change accumulator corresponding to the synaptic weight parameter and the learning error outcome received from the learning error modulator corresponding to the synaptic weight parameter.

10. The neurosynaptic processing core according to claim 9, wherein the learning error modulator further comprises a synaptic spike event record block comprising a plurality of post-synaptic spike event record parameters for the plurality of post-synaptic elements, respectively, each post-synaptic spike event record parameter indicating a number of post-synaptic spike events that occurred at the corresponding post-synaptic element, and the learning error determiner is configured to determine, for each of the plurality of synaptic weight parameters, the learning error for the synaptic weight parameter based on the post-synaptic spike event record parameter for the post-synaptic element corresponding to the synaptic weight parameter and a reference parameter for the post-synaptic element corresponding to the synaptic weight parameter.

11. The neurosynaptic processing core according to claim 1, wherein the synaptic weight modifier comprises a weight change determiner configured to determine a further weight change parameter for modifying the synaptic weight parameter based on the weight change parameter received from the weight change accumulator corresponding to the synaptic weight parameter and the learning error outcome received from the learning error modulator corresponding to the synaptic weight parameter.

12. The neurosynaptic processing core according to claim 7, wherein the pre-synaptic event accumulator, the post-synaptic event accumulator and the weight change accumulator are each configured to be triggered based on a first trigger signal associated with a first time step iteratively during the STDP learning, and the learning error modulator and the synaptic weight modifier are each configured to be triggered based on a second trigger signal.

13. The neurosynaptic processing core according to claim 12, wherein the pre-synaptic spike parameter incrementor of the pre-synaptic event accumulator is configured to be triggered based on the first trigger signal to receive the first pre-synaptic spike event input from the pre-synaptic block so as to increment the pre-synaptic spike parameter based on the first pre-synaptic spike event input received, the post-synaptic spike parameter incrementor of the post-synaptic event accumulator is configured to be triggered based on the first trigger signal to receive the first post-synaptic spike event input from the post-synaptic block so as to increment the post-synaptic spike parameter based on the first post-synaptic spike event input received, the synaptic spike event selector of the weight change accumulator is configured to be triggered based on the first trigger signal to receive the second pre-synaptic spike event input from the pre-synaptic block so as to select the post-synaptic spike parameter from the post-synaptic spike event memory block for output to the weight change parameter modifier based on the second pre-synaptic spike event input received or to receive the second post-synaptic spike event input from the post-synaptic block so as to select the pre-synaptic spike parameter from the pre-synaptic spike event memory block for output to the weight change parameter modifier based on the second post-synaptic spike event input received.

14. The neurosynaptic processing core according to claim 1, wherein one or more of the plurality of post-synaptic elements corresponds to one or more spiking neurons in a layer of the spiking neural network.

15. The neurosynaptic processing core according to claim 1, wherein the layer is an output layer of the spiking neural network.

16. A method of operating a neurosynaptic processing core with spike time dependent plasticity (STDP) learning for a spiking neural network, the neurosynaptic processing core comprising:

a spiking neuron block comprising a pre-synaptic block and a post-synaptic block, the pre-synaptic block comprising a plurality of pre-synaptic elements and the post-synaptic block comprising a plurality of post-synaptic elements;

a synapse block communicatively coupled to the spiking neuron block, the synapse block comprising a plurality of synaptic weight parameters, each synaptic weight parameter corresponding to a neuron pair comprising a pre-synaptic element of the plurality of pre-synaptic elements and a post-synaptic element of the plurality of post-synaptic elements;

a STDP learning block communicatively coupled to the spiking neuron block and the synapse block, the STDP learning block comprising:

a pre-synaptic event accumulator comprising:

a pre-synaptic spike event memory block comprising a plurality of pre-synaptic spike parameters corresponding to the plurality of pre-synaptic elements, respectively, each pre-synaptic spike parameter indicating a measure of one or more pre-synaptic spike events at the corresponding pre-synaptic element; and a pre-synaptic spike parameter modifier configured to modify a pre-synaptic spike parameter of the plurality of pre-synaptic spike parameters based on a first pre-synaptic spike event input from the pre-synaptic block indicating a pre-synaptic spike event at the corresponding pre-synaptic element;

a post-synaptic event accumulator comprising:

a post-synaptic spike event memory block comprising a plurality of post-synaptic spike parameters corresponding to the plurality of post-synaptic elements, respectively, each post-synaptic spike parameter indicating a measure of one or more post-synaptic spike events at the corresponding post-synaptic element; and a post-synaptic spike parameter modifier configured to modify a post-synaptic spike parameter of the plurality of post-synaptic spike parameters based on a first post-synaptic spike event input from the post-synaptic block indicating a post-synaptic spike event at the corresponding post-synaptic element; and a weight change accumulator comprising:

a weight change memory block comprising a plurality of weight change parameters corresponding to the plurality of synaptic weight parameters, respectively; and a weight change parameter modifier configured to modify a weight change parameter of the plurality of weight change parameters based a pre-synaptic spike parameter of the plurality of pre-synaptic spike parameters corresponding to the weight change parameter or a post-synaptic spike parameter of the plurality of post-synaptic spike parameters corresponding to the weight change parameter;

a learning error modulator configured to determine a plurality of learning errors associated with the STDP learning block for the plurality of synaptic weight parameters, respectively; and a synaptic weight modifier communicatively coupled to the STDP learning block, the learning error modulator and the synapse block, the synaptic weight modifier being configured to modify a synaptic weight parameter of the plurality of synaptic weight parameters based on a weight change parameter of the plurality of weight change parameters corresponding to the synaptic weight parameter and a learning error of the plurality of learning errors corresponding to the synaptic weight parameter, and the method comprising:

triggering the pre-synaptic event accumulator, the post-synaptic event accumulator and the weight change accumulator based on a first trigger signal associated with a first time step iteratively during the STDP learning; and triggering the learning error modulator and the synaptic weight modifier based on a second trigger signal;

wherein the neurosynaptic processing core is formed by a plurality of processors.

17. The method according to claim 16, wherein the pre-synaptic spike parameter modifier comprises a pre-synaptic spike parameter incrementor configured to increment the pre-synaptic spike parameter based on the first pre-synaptic spike event input received from the pre-synaptic block, the post-synaptic spike parameter modifier comprises a post-synaptic spike parameter incrementor configured to increment the post-synaptic spike parameter based on the first post-synaptic spike event input received from the post-synaptic block, and the weight change accumulator comprises a synaptic spike event selector configured to select the pre-synaptic spike parameter from the pre-synaptic spike event memory block for output to the weight change parameter modifier based on a second post-synaptic spike event input from the post-synaptic block indicating the post-synaptic spike event at the corresponding pre-synaptic element or select the post-synaptic spike parameter from the post-synaptic spike event memory block for output to the weight change parameter modifier based on a second pre-synaptic spike event input from the pre-synaptic block indicating the pre-synaptic spike event at the corresponding post-synaptic element, said triggering the pre-synaptic event accumulator comprises triggering the pre-synaptic spike parameter incrementor of the pre-synaptic event accumulator based on the first trigger signal to receive the first pre-synaptic spike event input from the pre-synaptic block so as to increment the pre-synaptic spike parameter based on the first pre-synaptic spike event input received, said triggering the post-synaptic event accumulator comprises triggering the post-synaptic spike parameter incrementor of the post-synaptic event accumulator based on the first trigger signal to receive the first post-synaptic spike event input from the post-synaptic block so as to increment the post-synaptic spike parameter based on the first post-synaptic spike event input received, and said triggering the weight change accumulator comprises triggering the synaptic spike event selector of the weight change accumulator based on the first trigger signal to receive the second pre-synaptic spike event input from the pre-synaptic block so as to select the post-synaptic spike parameter from the post-synaptic spike event memory block for output to the weight change parameter modifier based on the second post-synaptic spike event input received or to receive the second post-synaptic spike event input from the post-synaptic block so as to select the pre-synaptic spike parameter from the pre-synaptic spike event memory block for output to the weight change parameter modifier based on the second pre-synaptic spike event input received.

18. The method according to claim 17, wherein the learning error modulator comprises:

a learning error determiner configured to determine the plurality of learning errors for the plurality of synaptic weight parameters, respectively;

a learning error evaluator configured to determine a learning error outcome for the synaptic weight parameter based on a learning error of the plurality of learning errors corresponding to the synaptic weight parameter; and a synaptic spike event record block comprising a plurality of post-synaptic spike event record parameters for the plurality of post-synaptic elements, respectively, each post-synaptic spike event record parameter indicating a number of post-synaptic spike events that occurred at the corresponding post-synaptic element, and said triggering the learning error modulator comprising triggering the learning error determiner of the learning error modulator based on the second trigger signal to determine the plurality of learning errors for the plurality of synaptic weight parameters, respectively, the learning error determiner being configured to determine, for each of the plurality of synaptic weight parameters, the learning error for the synaptic weight parameter based on the post-synaptic spike event record parameter for the post-synaptic element corresponding to the synaptic weight parameter and a reference parameter for the post-synaptic element corresponding to the synaptic weight parameter.

19. The method according to claim 18, wherein the synaptic weight modifier comprises a weight change determiner configured to determine a further weight change parameter for modifying the synaptic weight parameter based on the weight change parameter received from the weight change accumulator corresponding to the synaptic weight parameter and the learning error outcome received from the learning error modulator corresponding to the synaptic weight parameter, and said triggering the synaptic weight modifier comprises triggering the synaptic weight modifier based on the second trigger signal to modify the synaptic weight parameter based on the weight change parameter received from the weight change accumulator corresponding to the synaptic weight parameter and the learning error outcome received from the learning error modulator corresponding to the synaptic weight parameter.

20. A method of forming a neurosynaptic processing core with spike time dependent plasticity (STDP) learning for a spiking neural network, the method comprising:

forming a spiking neuron block comprising a pre-synaptic block and a post-synaptic block, the pre-synaptic block comprising a plurality of pre-synaptic elements and the post-synaptic block comprising a plurality of post-synaptic elements;

forming a synapse block communicatively coupled to the spiking neuron block, the synapse block comprising a plurality of synaptic weight parameters, each synaptic weight parameter corresponding to a neuron pair comprising a pre-synaptic element of the plurality of pre-synaptic elements and a post-synaptic element of the plurality of post-synaptic elements;

forming a STDP learning block communicatively coupled to the spiking neuron block and the synapse block, the STDP learning block comprising:

a pre-synaptic event accumulator comprising:

a pre-synaptic spike event memory block comprising a plurality of pre-synaptic spike parameters corresponding to the plurality of pre-synaptic elements, respectively, each pre-synaptic spike parameter indicating a measure of one or more pre-synaptic spike events at the corresponding pre-synaptic element; and a pre-synaptic spike parameter modifier configured to modify a pre-synaptic spike parameter of the plurality of pre-synaptic spike parameters based on a first pre-synaptic spike event input from the pre-synaptic block indicating a pre-synaptic spike event at the corresponding pre-synaptic element;

a post-synaptic event accumulator comprising:

a post-synaptic spike event memory block comprising a plurality of post-synaptic spike parameters corresponding to the plurality of post-synaptic elements, respectively, each post-synaptic spike parameter indicating a measure of one or more post-synaptic spike events at the corresponding post-synaptic element; and a post-synaptic spike parameter modifier configured to modify a post-synaptic spike parameter of the plurality of post-synaptic spike parameters based on a first post-synaptic spike event input from the post-synaptic block indicating a post-synaptic spike event at the corresponding post-synaptic element; and a weight change accumulator comprising:

a weight change memory block comprising a plurality of weight change parameters corresponding to the plurality of synaptic weight parameters, respectively; and a weight change parameter modifier configured to modify a weight change parameter of the plurality of weight change parameters based a pre-synaptic spike parameter of the plurality of pre-synaptic spike parameters corresponding to the weight change parameter or a post-synaptic spike parameter of the plurality of post-synaptic spike parameters corresponding to the weight change parameter;

forming a learning error modulator configured to determine a plurality of learning errors associated with the STDP learning block for the plurality of synaptic weight parameters, respectively; and forming a synaptic weight modifier communicatively coupled to the STDP learning block, the learning error modulator and the synapse block, the synaptic weight modifier being configured to modify a synaptic weight parameter of the plurality of synaptic weight parameters based on a weight change parameter of the plurality of weight change parameters corresponding to the synaptic weight parameter and a learning error of the plurality of learning errors corresponding to the synaptic weight parameter;

wherein the neurosynaptic processing core is formed by a plurality of processors.

* * * * *